United States Patent
Hooshyari et al.

(10) Patent No.: US 10,826,099 B2
(45) Date of Patent: Nov. 3, 2020

(54) PROTON EXCHANGE COMPOSITE MEMBRANE

(71) Applicants: Khadijeh Hooshyari, Tehran (IR); Mehran Javanbakht, Tehran (IR); Mina Adibi, Tehran (IR); Amirkabir University of Technology, Tehran (IR); Tagh-e-Mina Energy Technology Co., Tehran (IR)

(72) Inventors: Khadijeh Hooshyari, Tehran (IR); Mehran Javanbakht, Tehran (IR); Mina Adibi, Tehran (IR)

(*) Notice: Subject to any disclaimer, the term of this patent is extended or adjusted under 35 U.S.C. 154(b) by 298 days.

(21) Appl. No.: 15/809,961

(22) Filed: Nov. 10, 2017

(65) Prior Publication Data

US 2018/0069257 A1 Mar. 8, 2018

Related U.S. Application Data

(60) Provisional application No. 62/435,897, filed on Dec. 19, 2016.

(51) Int. Cl.
| | |
|---|---|
| H01M 4/86 | (2006.01) |
| H01M 8/1041 | (2016.01) |
| H01M 4/88 | (2006.01) |
| H01M 8/1081 | (2016.01) |
| H01M 8/103 | (2016.01) |
| C08J 5/22 | (2006.01) |
| H01M 8/1048 | (2016.01) |

(52) U.S. Cl.
CPC .......... *H01M 8/1041* (2013.01); *C08J 5/22* (2013.01); *C08J 5/2256* (2013.01); *C08J 5/2287* (2013.01); *H01M 4/86* (2013.01); *H01M 4/8857* (2013.01); *H01M 8/103* (2013.01); *H01M 8/1048* (2013.01); *H01M 8/1081* (2013.01); *C08J 2379/04* (2013.01); *Y02P 70/56* (2015.11)

(58) Field of Classification Search
CPC ...... H01M 8/1041; H01M 4/88; H01M 8/103; H01M 8/1048; H01M 8/1081; H01M 4/86; H01M 4/8857; C08J 5/22; C08J 5/2256; C08J 5/2287
See application file for complete search history.

(56) References Cited

U.S. PATENT DOCUMENTS

| | | | |
|---|---|---|---|
| 2008/0050633 A1* | 2/2008 | Kwon | H01M 4/921 |
| | | | 429/483 |
| 2013/0175168 A1* | 7/2013 | Nemes | G01N 33/004 |
| | | | 204/415 |

OTHER PUBLICATIONS

Zhang et al Electrochimica Acta 53 (2008) 4833-4838 (Year: 2008).*
A.K. Mishra et al, Journal of Membrane Science 449 (2014) 136-145 (Year: 2014).*

(Continued)

*Primary Examiner* — Alexander Usyatinsky
(74) *Attorney, Agent, or Firm* — Bajwa IP Law Firm; Haris Zaheer Bajwa

(57) ABSTRACT

A proton exchange composite membrane (PECM) and a method of synthesizing the membrane are disclosed. The PECM may include a PBI membrane doped with an acid, an imidazolium-based dicationic ionic liquid, and a mesoporous material. This PECM can be used as an improved high-temperature polymer electrolyte membrane (HT-PEM) fuel cell. The disclosed fuel cell can provide improved proton conductivity, acid uptake, and thermal stability.

9 Claims, 30 Drawing Sheets

(56) References Cited

OTHER PUBLICATIONS

Anderson et all. J. Am. Chem. Soc. 2005, 127, 593-604 (Year: 2005).*
Masri et al Ind, Eng, Manage, 5, 197, 2016. p. 197 (Year: 2016).*
Payagala et. al. Chem. Mater. 2007, 19, 5848-5850 (Year: 2007).*
Saana et. el., ACS Appl. Mater. Interfaces 2013, 5, 11535-11543. (Year: 2013).*
Ibrahim Saana Amiinu et al, Anhydrous proton conducting materials based on sulfonated dimethylphenethylchlorosilane grafted mesoporous silica/ionic liquid composite., ASC applied materials & interfaces 5.22 (2013): 11535-11543.

* cited by examiner

PROTON EXCHANGE COMPOSITE MEMBRANE

CROSS-REFERENCE TO RELATED APPLICATION

This application claims the benefit of priority from U.S. Provisional Patent Application Ser. No. 62/435,897, filed on Dec. 19, 2016, and entitled "PROTON EXCHANGE COMPOSITE MEMBRANES AND APPLICATIONS THEREOF IN HIGH TEMPERATURE PROTON EXCHANGE MEMBRANE FUEL CELLS," which is incorporated herein by reference in its entirety.

TECHNICAL FIELD

The present disclosure generally relates to proton exchange composite membranes, and particularly to methods for preparation of proton exchange composite membranes and applications thereof in high-temperature proton exchange membrane fuel cells.

BACKGROUND

Development of membranes for high-temperature polymer electrolyte membrane (HT-PEM) fuel cells under anhydrous conditions may permit higher operating voltages at higher temperatures. Polybenzimidazole (PBI) doped with acids may be used as an electrolyte in HT-PEM fuel cells. Phosphoric acid (PA) may be used for doping PBI to obtain a PA-doped PBI (PA-PBI). However, in PA-PBI membranes, dehydration of PA at temperatures above 150° C. may result in a decrease in proton conductivity. In order to overcome this limitation, ionic liquids may be incorporated into a PBI membrane under anhydrous conditions. Ionic liquids have several characteristics such as high ionic conductivity, electrochemical stability, and thermal stability at higher temperatures (>150° C.) that make them good candidates for being used as an electrolyte in HT-PEM fuel cells.

PBI composite membranes may be prepared by incorporation of ionic liquids containing imidazolium cations into PBI membranes. Incorporation of ionic liquids containing imidazolium cations into PBI membranes may increase the thermal stability and proton conductivity of PBI membrane under anhydrous conditions. However, in long-term fuel cell operations, the dragging of ionic liquids by water molecules and ionic liquid leakages may be disadvantageous. Mesoporous materials such as ordered mesoporous silica may be used as a diffusional barrier to prevent gradual ionic liquid leakage or dragging during long-term operation of HT-PEM fuel cells. However, there remains a need for a process of synthesizing HT-PEMs with improved proton conductivity, acid uptake, and thermal stability, providing improved performance of HT-PEM fuel cells.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure is directed to a proton exchange composite membrane is disclosed that may include a PBI membrane doped with an acid, an imidazolium-based dicationic ionic liquid, where a molar ratio of the PBI to the imidazolium-based dicationic ionic liquid is between 2:1 and 11:1, and a mesoporous material, where the mesoporous material is present at an amount ranging between 2 and 11 percent of a total weight of the PBI.

The above general aspects may have one or more of the following features. For example, the imidazolium-based dicationic ionic liquid can include anions such as $CH_3CO_2$, $CH_3SO_4$, $C(CF_3SO_2)_2$, $(Tf_2N)$ $N(CF_3SO_2)_2$, $(TfO)$ $CF_3SO_2$, $BF_4$, $PF_6$, $ASF_6$, $SbF_6$, $CF_3CO_2$, or $AlCl_4$. According to some implementations, the imidazolium-based dicationic ionic liquid may be 1,3-di(3-methylimidazolium) propane bis (trifluoromethylsulfonyl) imide, 1,6-di(3-methylimidazolium) hexane bis (hexafluorophosphate), 1,5 bis (3-benzyl-2-methylimidazolium) pentane di-bis (trifloromethanesulfonyl) imide, 1,5 bis (3-methyl-2-phenylimidazolium) pentane di-bis (trifloromethanesulfonyl) imide, 1,5 bis (2,3-dimethylimidazolium) pentane di-bis (trifloromethanesulfonyl) imide, 1,10 bis (2,3-methylimidazolium) decane di-bis (trifluoromethanesulfonyl) imide, 1,10 bis (2,3-dimethylimidazolium) decane di-bis (trifluoromethanesulfonyl) imide, or combinations thereof. In other implementations, the imidazolium-based dicationic ionic liquid may be 1,3-di(3-methylimidazolium) propane bis (trifluoromethylsulfonyl) imide, 1,6-di(3-methylimidazolium) hexane bis (hexafluorophosphate), or combinations thereof. In some cases, the mesoporous material may be SBA-15, SBA-16, MCM-41, or MCM-48. In another example, the mesoporous material may be a modified mesoporous material such as mesoporous SBA-15 silica sulfonic acid or mesoporous SBA-15 silica phenyl sulfonic acid. According to one implementation, the acid may be phosphoric acid. In some cases, the proton exchange composite membrane has an activation energy ranging between 14 and 21 kJ. In another example, a tensile strength of the proton exchange composite membrane ranges between approximately 18 and 34 MPa. In some implementations, the current density of the proton exchange composite membrane ranges between approximately 0.6 and 1.2 $A/cm^2$ at 0.5 V and 180° C. As another example, a power density of the proton exchange composite membrane can range between approximately 0.3 and 0.6 $W/cm^2$ at 0.5 V and 180° C.

In another general aspect, the present disclosure is directed to a method for synthesizing a proton exchange composite membrane. The method may include one or more of the following steps: preparing a PBI solution by dissolving PBI powder in a solvent, and adding an imidazolium-based dicationic ionic liquid to the PBI solution to obtain a second solution. A molar ratio of the PBI to the imidazolium-based dicationic ionic liquid can be between 2:1 and 11:1. The method further includes dispersing a mesoporous material in the second solution to obtain a third solution, where the mesoporous material is present at an amount ranging between 2 and 11 percent of a total weight of the PBI. The method may further include casting the third solution, removing the solvent from the third solution to obtain a composite membrane, and doping the composite membrane with phosphoric acid. The imidazolium-based dicationic ionic liquid includes anions selected from the group consisting of $CH_3CO_2$, $CH_3SO_4$, $C(CF_3SO_2)_2$, $(Tf_2N)$ $N(CF_3SO_2)_2$, $(TfO)$ $CF_3SO_2$, $BF_4$, $PF_6$, $ASF_6$, $SbF_6$, $CF_3CO_2$, and $AlCl_4$.

The above general aspects may have one or more of the following features. For example, the imidazolium-based dicationic ionic liquid can be selected from the group consisting of 1,3-di(3-methylimidazolium) propane bis (trifluoromethylsulfonyl) imide, 1,6-di(3-methylimidazolium) hexane bis (hexafluorophosphate), 1,5 bis (3-benzyl-2-methyimidazolium) pentane di-bis (triloromethanesulfonyl) imide, 1,5 bis (3-methyl-2-phenylimidazolium) pentane di-bis (trifloromethanesulfonyl) imide, 1,5 bis (2,3-dimethylimidazolium) pentane di-bis (trifloromethanesulfonyl) imide, 1,10 bis (2,3-methylimidazolium) decane di-bis (trifluoromethanesulfonyl) imide, 1,10 bis (2,3-dimethylimidazolium) decane di-bis (trifluoromethanesulfonyl) imide and combinations thereof. In another example, the imidazolium-based dicationic ionic liquid is selected from the group consisting of 1,3-di(3-methylimidazolium) propane bis (trifluoromethylsulfonyl) imide, 1,6-di(3-methylimidazolium) hexane bis (hexafluorophosphate), and combinations thereof. In some implementations, the mesoporous material is selected from the group consisting of SBA-15, SBA-16, MCM-41, and MCM-48. In other implementations, the mesoporous material is selected from the group consisting of mesoporous SBA-15 silica sulfonic acid and mesoporous SBA-15 silica phenyl sulfonic acid. In some cases, doping the composite membrane includes using a phosphoric acid. As an example, the composite membrane may be doped with phosphoric acid at a concentration of 85 wt % over approximately 5 days. In one implementation, casting the third solution includes casting onto glass plates by a film applicator.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein. In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following disclosure describes a composite proton exchange membrane and a method for preparing the composite proton exchange membrane, where the membrane may include polybenzimidazole (PBI) doped with an acid, a dicationic ionic liquid including imidazolium cations, and a mesoporous material.

Figure 1:
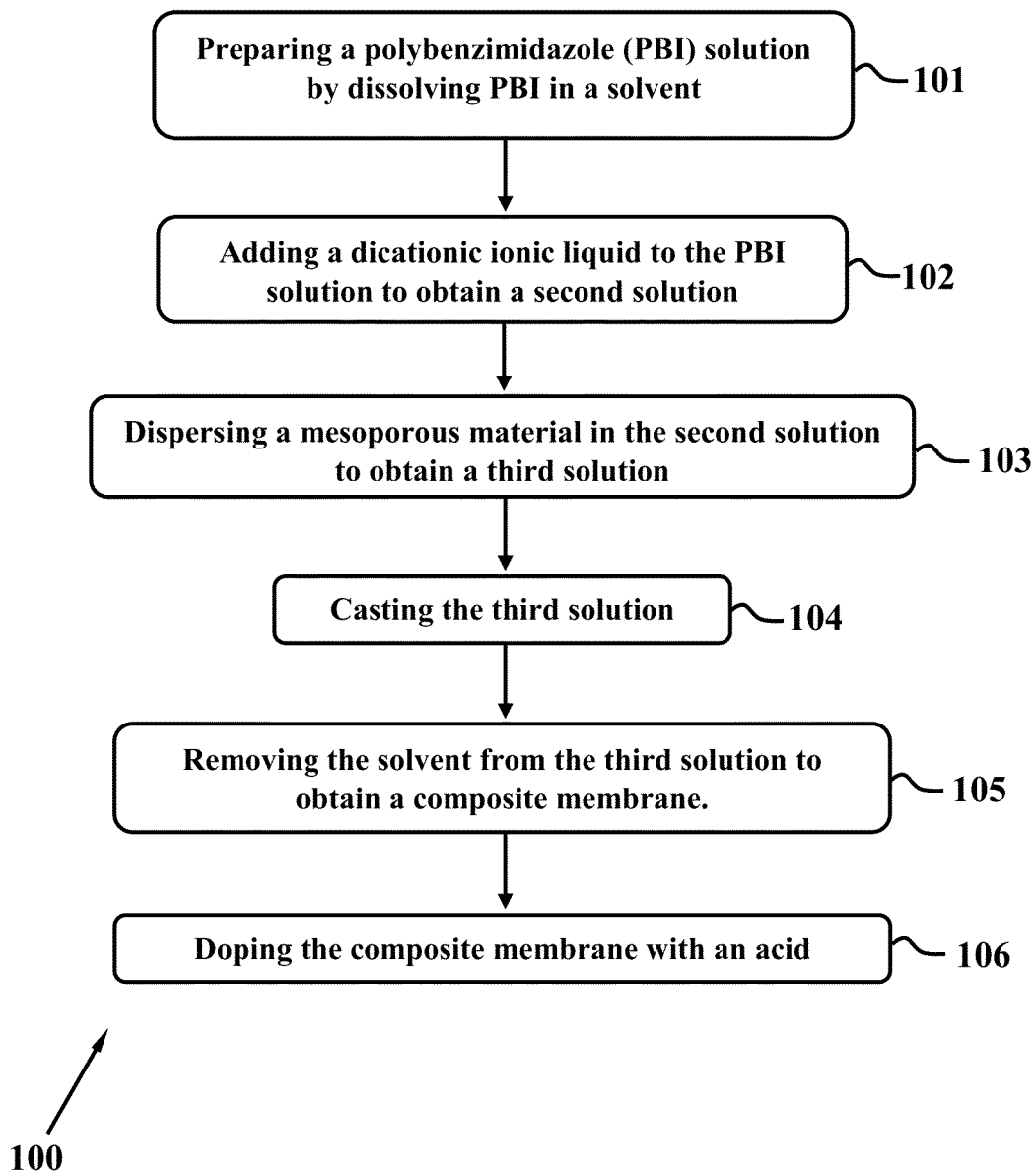
FIG. 1 depicts a method for synthesizing a composite proton exchange membrane according to one or more implementations of the present disclosure.

In order to provide the reader with an overview, FIG. 1 illustrates a method 100 for synthesizing a composite proton exchange membrane according to one or more implementations of the present disclosure. In one implementation, the method 100 may include a first step 101 of preparing a PBI solution by dissolving PBI powder in a solvent; a second step 102 of adding a dicationic ionic liquid to the PBI solution to obtain a second solution; a third step 103 of dispersing a mesoporous material in the second solution to obtain a third solution; a fourth step 104 of casting the third solution; a fifth step 105 of removing the solvent from the third solution to obtain a composite membrane; and a sixth step 106 of doping the composite membrane with an acid. Additional details regarding these steps are provided below.

With respect to the first step 101, in some implementations, the preparation of the PBI solution may involve dissolving the PBI powder in an organic solvent such as dimethylacetamide (DMAc) under a nitrogen atmosphere at a temperature of approximately 150° C. According to one implementation, the PBI solution may have a concentration of at least 2 wt %.

Furthermore, in some implementations, in the second step 102 of method 100, a dicationic ionic liquid (IL) may be added to the PBI solution to obtain a second solution containing PBI and the dicationic ionic liquid with a PBI to IL molar ratio between 2:1 and 9:1.

According to one implementation, the addition of dicationic IL to the PBI solution may be followed by rigorous stirring at a temperature of approximately 35° C. for a predetermined amount of time, for example 24 h.

With respect to the second step 102, according to some implementations, the dicationic IL may be a dicationic IL that includes imidazolium cations. A dicationic IL that includes imidazolium cations is referred to herein as imidazolium-based dicationic IL. The imidazolium-based dicationic IL may have different anions such as $CH_3CO_2$, $CH_3SO_4$, $C(CF_3SO_2)_2$, $(Tf_2N)$ $N(CF_3SO_2)_2$, $(TfO)$ $CF_3SO_2$, $BF_4$, $PF_6$, $ASF_6$, $SbF_6$, $CF_3CO_2$, $AlCl_4$ and the like. For example, the imidazolium-based IL may be 1,3-di(3-methylimidazolium) propane bis (trifluoromethylsulfonyl) imide, 1,6-di(3-methylimidazolium) hexane bis (hexafluorophosphate), 1,5 bis (3-benzyl-2-methyimidazolium) pentane di-bis (trifloromethanesulfonyl) imide, 1,5 bis (3-methyl-2-phenylimidazolium) pentane di-bis (trifloromethanesulfonyl) imide, 1,5 bis (2,3-dimethylimidazolium) pentane di-bis (trifloromethanesulfonyl) imide, 1,10 bis (2,3-methylimidazolium) decane di-bis (trifluoromethanesulfonyl) imide, 1,10 bis (2,3-dimethylimidazolium) decane di-bis (trifluoromethanesulfonyl) imide or a combination thereof.

In addition, according to some implementations, the third step 103 may involve dispersing a mesoporous material such as mesoporous silica in the second solution to obtain a third solution. For example, a mesoporous silica such as SBA-15, SBA-16, MCM-41, or MCM-48 may be dispersed in the second solution. According to one implementation, functionalized mesoporous silica, such as mesoporous SBA-15 silica sulfonic acid or mesoporous SBA-15 silica phenyl sulfonic acid (SBA-15-Ph-$SO_3H$) may be dispersed in the second solution with, for example, an ultrasonic probe. According to some implementations, the mesoporous material may be dispersed in the second solution with a weight percent of mesoporous material/PBI between about 5 and 15.

With respect to fourth step 104, in one implementation, the third solution may be cast or otherwise coated on a glass plate using a film applicator to form a thin film of the third solution. In fifth step 105, in some implementations, the solvent in the thin film of the third solution may be removed by heating the film of the third solution and thereby evaporating the solvent. According to one implementation, the thin film of the third solution may be heated at a temperature of approximately 80° C. for about 16 h and then at a temperature of 120° C. for 5 h under vacuum in order to remove the solvent and obtain the composite membrane.

Referring again to FIG. 1, according to one implementation, after removing the solvent from the third solution and obtaining the composite membrane, method 100 may proceed to the sixth step 106. In some implementations, the sixth step 106 may involve doping the composite membrane with an acid such as phosphoric acid for a predetermined amount of time to obtain the composite proton exchange membrane of the present disclosure. According to one implementation, the composite membrane may be doped with phosphoric acid with a concentration of about 85% for around 5 days.

In some implementations, the composite proton exchange membrane that may be synthesized as described in detail in connection with method 100 of FIG. 1 may include PBI doped with phosphoric acid, an imidazolium-based dicationic IL, and a functionalized mesoporous silica. An imidazolium-based dicationic IL includes two singly charged imidazolium cations that are linked by an alkyl chain spacer and are paired with two singly charged anions.

Figure 2:
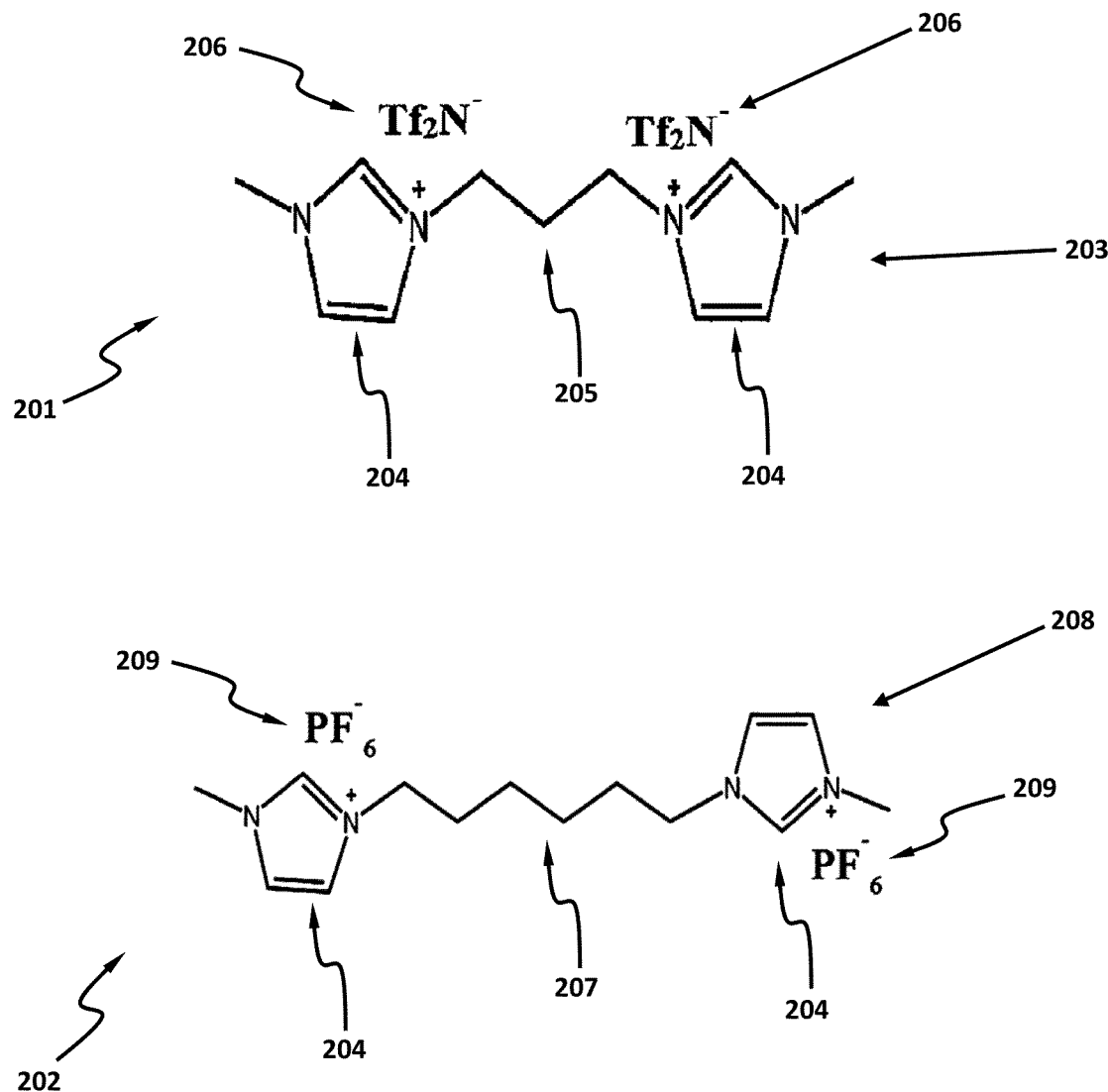
FIG. 2 illustrates a structure of 1,3-di(3-methylimidazolium) propane bis (trifluoromethylsulfonyl) imide and a structure of 1,6-di(3-methylimidazolium) hexane bis (hexafluorophosphate)

For example, FIG. 2 illustrates a structure 201 of 1,3-di (3-methylimidazolium) propane bis (trifluoromethylsulfonyl) imide (referred to herein as $DC_3$) and a structure 202 of 1,6-di(3-methylimidazolium) hexane bis (hexafluorophosphate) (referred to herein as $DC_6$). In FIG. 2, structure 201 includes two singly charged imidazolium cations 204 that are linked by an alkyl chain spacer 205 to compose a doubly charged cation 203. The two singly charged imidazolium cations 204 are paired with two singly charged Bis (trifluoromethanesulfonyl) imide ($Tf_2N$) anions 206 to form the $DC_3$ ionic liquid. With further reference to FIG. 2, structure 202 also includes two singly charged imidazolium cations 204 that are linked by an alkyl chain spacer 207 to compose a doubly charged cation 208. The two singly charged imidazolium cations 204 are paired with two singly charged bis (hexafluorophosphate) ($PF_6$) anions 209 to form the $DC_6$ ionic liquid. It should be understood that the imidazolium-based dicationic IL may include different anions such as $CH_3CO_2$, $CH_3SO_4$, $C(CF_3SO_2)_2$, $(Tf_2N)$ $N(CF_3SO_2)_2$, (TfO) $CF_3SO_2$, $BF_4$, $PF_6$, $ASF_6$, $SbF_6$, $CF_3CO_2$, $AlCl_4$ and the like.

In some implementations, the composite proton exchange membrane that may be synthesized as described in detail in connection with method 100 of FIG. 1 may have a general formula of $SBA_y$-(PA-PBI) $DCIL_x$, where SBA represents the functionalized mesoporous silica. In different implementations, the functionalized mesoporous silica may be for example a mesoporous SBA-15 silica sulfonic acid or a mesoporous SBA-15 silica phenyl sulfonic acid. PA-PBI represents the PBI doped with phosphoric acid and DCIL represents the imidazolium-based dicationic IL. In the formula, y is weight ratio of functionalized mesoporous silica to PBI and x is mole ratio of PBI/IL. According to one implementation, y may have a value between about 5 and 15 and x may have a value between about 2 and 9.

Example

In the following example, four different composite proton exchange membranes were synthesized by the method 100 of FIG. 1. $SBA-15-Ph-SO_3H$ were used as the functionalized mesoporous silica and two types of dicationic ionic liquids $DC_3$, $DC_6$, as well as two types of monocationic ionic liquids 1-hexyl-3-methylimidazolium bis (trifluoromethanesulfonyl) imide (referred to herein as $MC_6$) and 1-butyl-3-methylimidazolium hexafluorophosphate) (referred to herein as $MC_4$) were used as the ionic liquid for synthesizing the four different composite proton exchange membranes.

In order to synthesize the composite proton exchange membranes, PBI powder was first dissolved in DMAc under a nitrogen atmosphere at 150° C. to obtain a PBI solution with a concentration of 2 wt %. Then $DC_3$, $DC_6$, $MC_4$, and $MC_6$ ionic liquids were added to the PBI solutions in four separate containers to obtain four different second solutions. The four second solutions were vigorously stirred for approximately 24 hours at 35° C. Following this step, different amounts of mesoporous $SBA-15-Ph-SO_3H$ were dispersed in the four second solutions using an ultrasonic bath. The obtained solutions were then directly cast onto glass plates by a film applicator. The cast solutions were heated at 80° C. for approximately 16 hours and then at 120° C. for 5 hours under vacuum to remove DMAc solvent to obtain four membranes $SBA_y$-$PDC_{3x}$, $SBA_y$-$PDC_{6x}$, $SBA_y$-$PMC_{6x}$ and $SBA_y$-$PMC_{4x}$. The obtained four membranes were then doped with phosphoric acid (PA) with a concentration of 85 wt % for approximately 5 days to obtain doped composite membranes that are referred to herein as $SBA_y$-$PPDC_{3x}$, $SBA_y$-$PPDC_{6x}$, $SBA_y$-$PPMC_{6x}$ and $SBA_y$-$PPMC_{4x}$. Here, x represents mole ration of PBI/ionic liquid. In this example, for dicationic ionic liquids $DC_3$ and $DC_6$, x is chosen to be 4 and for monocationic ionic liquids $MC_4$ and $MC_6$, x is chosen to be 3. Furthermore, y represents weight ratio of PBI/mesoporous $SBA-15-Ph-SO_3H$. Consequently, the obtained composite membranes before doping with PA are referred to as $SBA_{11}$-$PDC_{34}$, $SBA_9$-$PDC_{64}$, $SBA_9$-$PMC_{63}$ and $SBA_7$-$PMC_{43}$, and doped composite membranes in this example are referred to as $SBA_{11}$-$PPDC_{34}$, $SBA_9$-$PPDC_{64}$, $SBA_9$-$PPMC_{63}$ and $SBA_7$-$PPMC_{43}$.

Figure 3:
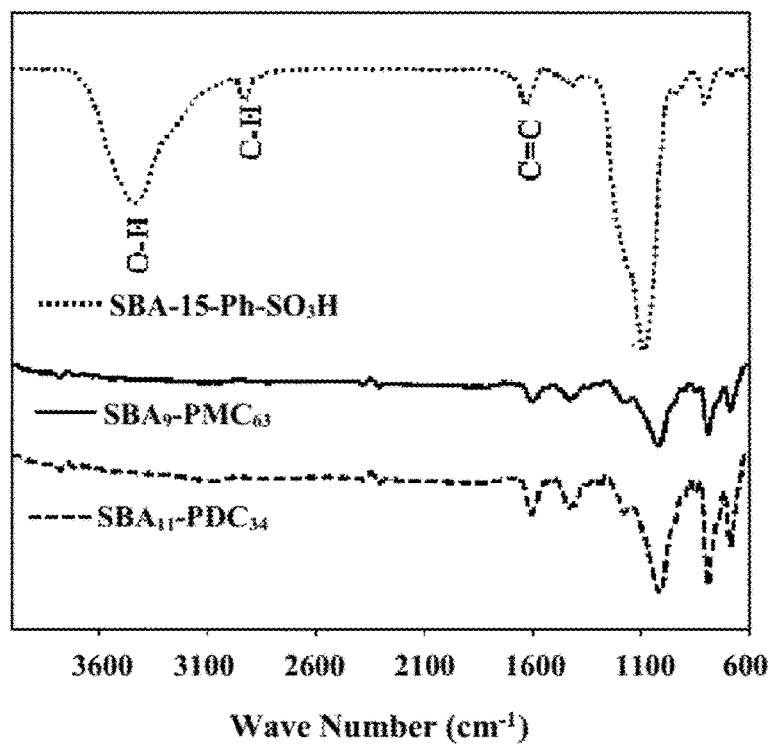
FIG. 3 presents an attenuated total reflection Fourier transform infrared spectroscopy (ATR-FTIR) spectra of mesoporous SBA-15-Ph-$SO_3H$ and four composite membranes of $SBA_{11}$-$PDC_{34}$, $SBA_9$-$PDC_{64}$, $SBA_9$-$PMC_{63}$ and $SBA_4$-$PMC_{43}$, according to one or more implementations of the present disclosure.
Figure 3:
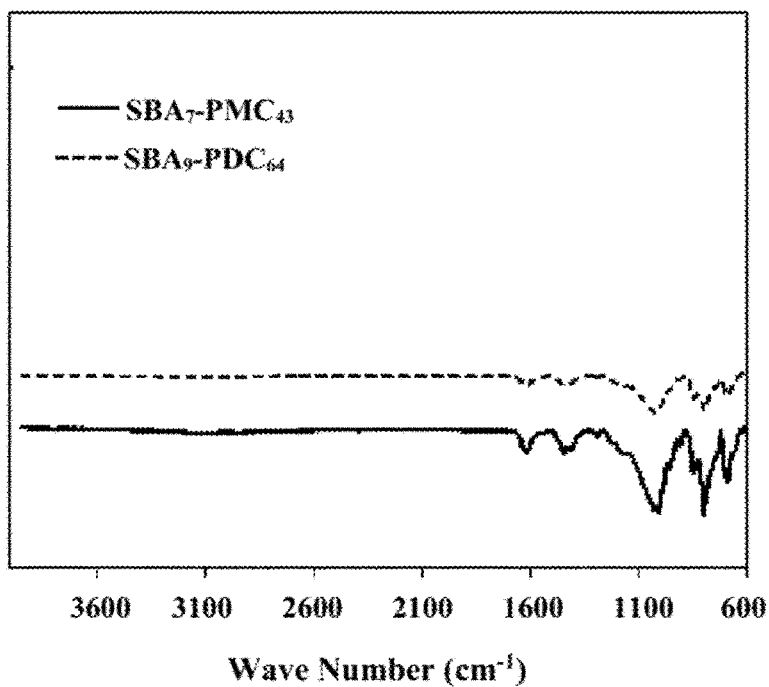

Referring now to FIG. 3, attenuated total reflection Fourier transform infrared spectroscopy (ATR-FTIR) spectra of mesoporous $SBA-15-Ph-SO_3H$ and four composite membranes of $SBA_{11}$-$PDC_{34}$, $SBA_9$-$PDC_{64}$, $SBA_9$-$PMC_{63}$ and $SBA_7$-$PMC_{43}$ are shown. The presence of sulfonic acid group in the composite membranes may be confirmed by the absorption bands assigned to the sulfonic acid group at 1145 $cm^{-1}$ (asymmetric O=S—O stretch), 1030 $cm^{-1}$ (S=O stretch), and 830 $cm^{-1}$ (S—O stretch). The 1050 and 800 $cm^{-1}$ regions correspond to Si—O—Si and Si—O—Si stretching of the silicate network, respectively. The peak at 880-920 $cm^{-1}$ corresponds to the Si—OH stretching vibration of the hydrogen-bonded silanol groups in SBA-15. The peaks of single substituted phenyl group also appear at 740 and 700 $cm^{-1}$, respectively. The band at 1000-1250 cm-1 may be attributed to the stretching of the $Tf_2N$ anion in composite membranes. The peak around 1445 $cm^{-1}$ may suggest deformation of benzimidazole "Breathing" mode of imidazole rings of the PBI membrane. The peak at 1600 $cm^{-1}$ may be assigned to the C=C and C=N stretching groups and the peak at 2900 $cm^{-1}$ may be assigned to the stretching vibration of aromatic C—H groups.

The proton conductivities of the composite membranes were evaluated by in-plane measurements using four-point-probe AC impedance spectroscopy. Measurements were carried out with a PGSTAT303N potentiostat/galvanostat (Ecochemie) with a frequency range of 100 Hz to 1 MHz and voltage amplitude of 50 mV. Temperature was controlled using a Globe Tech Computer Cell GT fuel cell test station. It is generally believed that the in-plane conductivity measurements are easier to carry out and provide greater accuracy due to the larger cell constant, L/A, where L is the distance between electrodes, usually several millimeters, and A is the cross-sectional area of the sample. Conductivity measurements of $DC_6$ and $MC_4$ ILs in PA solution (Purity: 85%) were carried out using Thermo Fisher Scientific/Eutech Instrument PC700 pH/mV/Conductivity meter.

Figure 4:
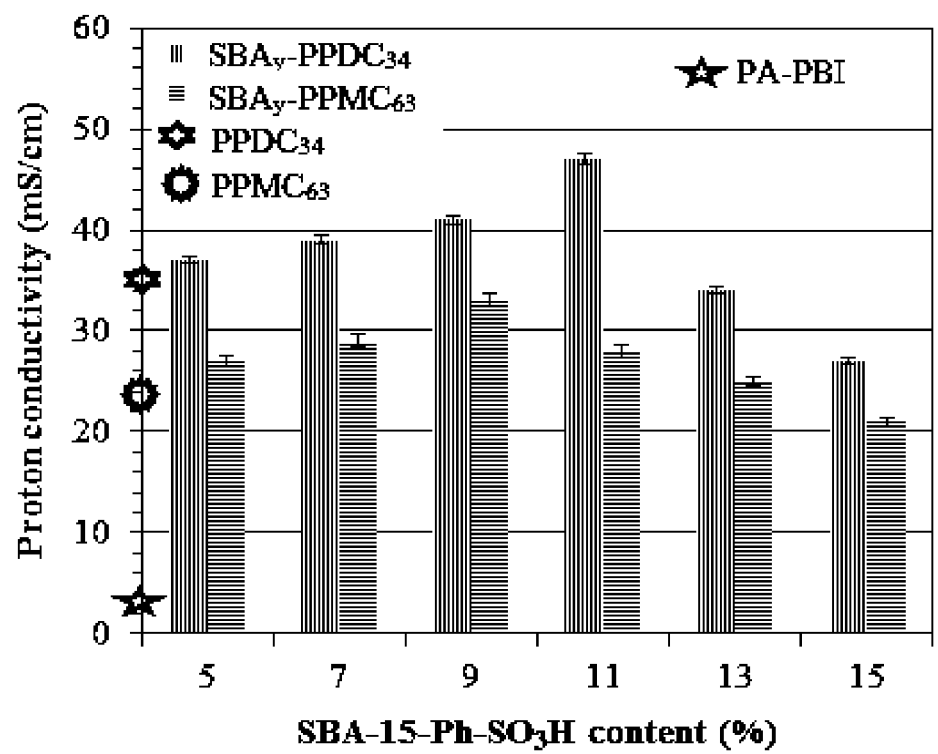
FIG. 4 is a proton conductivity plot of $SBA_y$-$PPDC_{34}$ and $SBA_y$-$PPMC_{63}$ composite membranes and PA-PBI, $PPDC_{34}$ and $PPMC_{63}$ composite membranes versus SBA-15-Ph-$SO_3H$ content, according to one implementation of the present disclosure.

FIG. 4 is a proton conductivity plot of $SBA_y$-$PPDC_{34}$ and $SBA_y$-$PPMC_{63}$ composite membranes and PA-PBI, $PPDC_{34}$ and $PPMC_{63}$ composite membranes versus SBA content which is represented by y. PA-PBI is a PBI membrane doped with PA, $PPDC_{34}$ and $PPDC_{63}$ are composite membranes containing dicationic ionic liquids $DC_3$ and $DC_4$ to which no mesoporous silica were added.

As shown in FIG. 4, proton conductivity of PA-PBI membrane was 3.1 mS/cm in 25° C. The $SBA_{11}$-$PPDC_{34}$ and $SBA_9$-$PPMC_{63}$ composite membranes displayed a higher proton conductivity compared to the PA-PBI membranes. This improvement may be attributed to the hygroscopic nature and high surface area of mesoporous $SBA-15-Ph-SO_3H$. Presence of highly hydrophilic mesoporous $SBA-15-Ph-SO_3H$ within the matrix of the composite membranes may increase the PA uptake ability of composite membranes to a higher amount compared to that of PBI membranes. High surface area of $SBA-15-Ph-SO_3H$ mesoporous provides hydrogen bond interactions between mesoporous silica, ionic liquids, PA and PBI in composite membranes. The pore size of SBA-15-Ph-SO$_3$H mesoporous is 4.8 nm and may play a relatively important role in increasing the proton conductivity of composite membranes. The SBA$_y$-PPDC$_{34}$ composite membranes demonstrated higher conductivity in comparison with SBA$_y$-PPMC$_{63}$ composite membranes. This result may be attributed to high interactions of DC$_3$ ionic liquid and mesoporous SBA-15-Ph-SO$_3$H. Mesoporous SBA-15-Ph-SO$_3$H may make strong and effective hydrogen bond interactions with high charge density of DC$_3$ ionic liquid. The SBA$_{11}$-PPDC$_{34}$ composite membrane displayed the highest conductivity (47 mS/cm) in comparison with other composite membranes. Increasing the mesoporous SBA-15-Ph-SO$_3$H content in SBA$_y$-PPDC$_{34}$ and SBA$_y$-PPMC$_{63}$ composite membranes (a y>1 for SBA$_y$-PPDC$_{34}$ and a y>9 for SBA$_y$-PPMC$_{63}$) decreases the proton conductivity of composite membranes. These results can be attributed to the self-aggregation of the SBA-15-Ph-SO$_3$H mesoporous inside the composite membranes.

Figure 5:
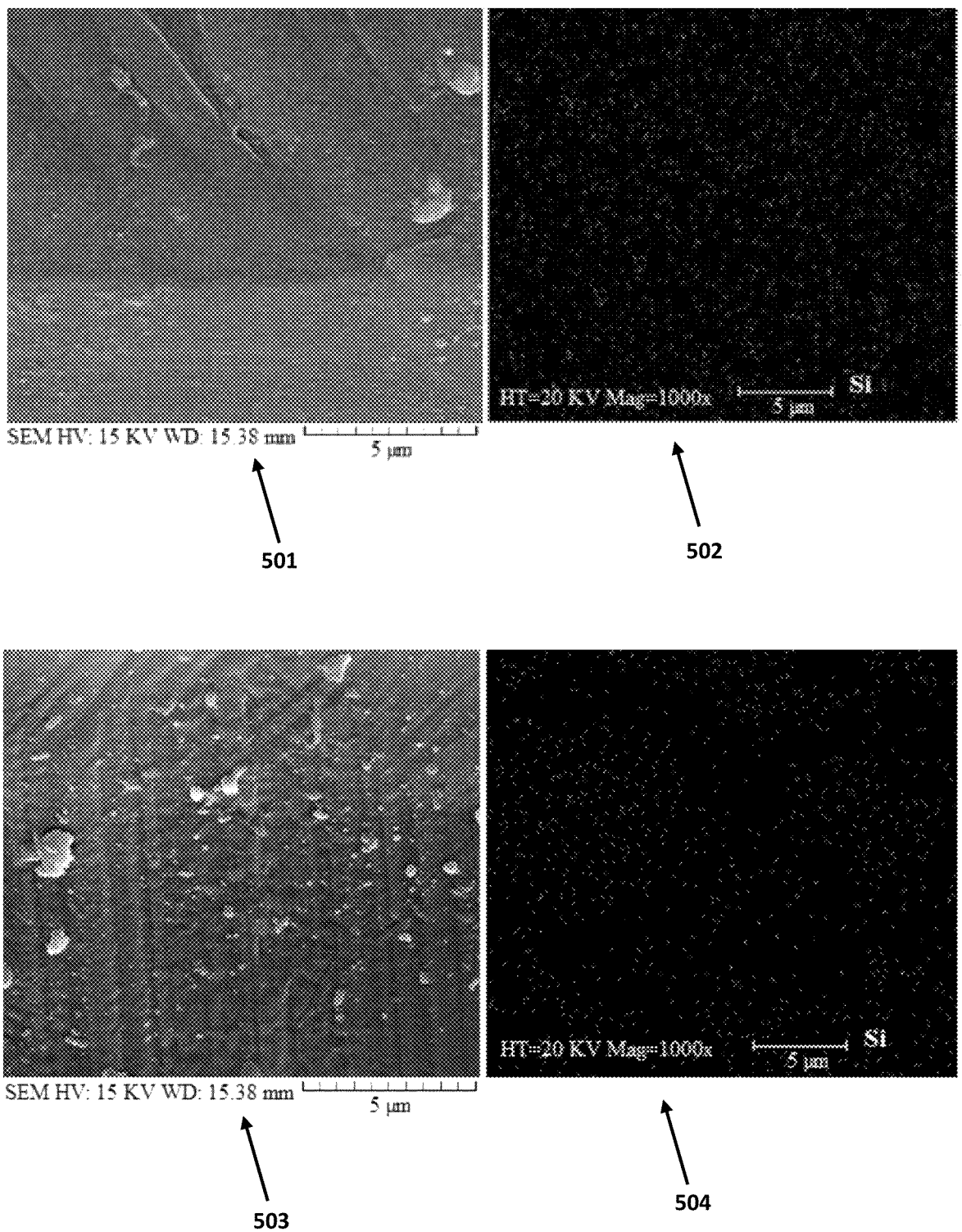
FIG. 5 presents scanning electron microscope with energy dispersive X-ray spectroscope (SEM-EDX) images of $SBA_{11}$-$PDC_{34}$ and $SBA_{15}$-$PDC_{34}$, according to one implementation of the present disclosure.

FIG. 5 shows scanning electron microscope with energy dispersive X-ray spectroscope (SEM-EDX) images 501 and 502 of SBA$_{11}$-PDC$_{34}$ and SEM-EDX images 503 and 504 of SBA$_{15}$-PDC$_{34}$. Referring to image 502, mesoporous SBA-15-Ph-SO$_3$H has a homogenous distribution in the cross-section of SBA$_{11}$-PDC$_{34}$ composite membrane. In contrast, referring to image 504, significant agglomerations of Si particles are noticeably observable in the SBA$_{15}$-PDC$_{34}$ composite membrane. Thus, it can be understood that images 502 and 504 support that aggregation of the Si nanoparticles happens at high content of mesoporous SBA-15-Ph-SO$_3$H. The self-aggregate of Si particles leads to a decrease in the active surface area of the SBA-15-Ph-SO$_3$H, and consequently the proton conductivity of the membrane is decreased.

Figure 6:
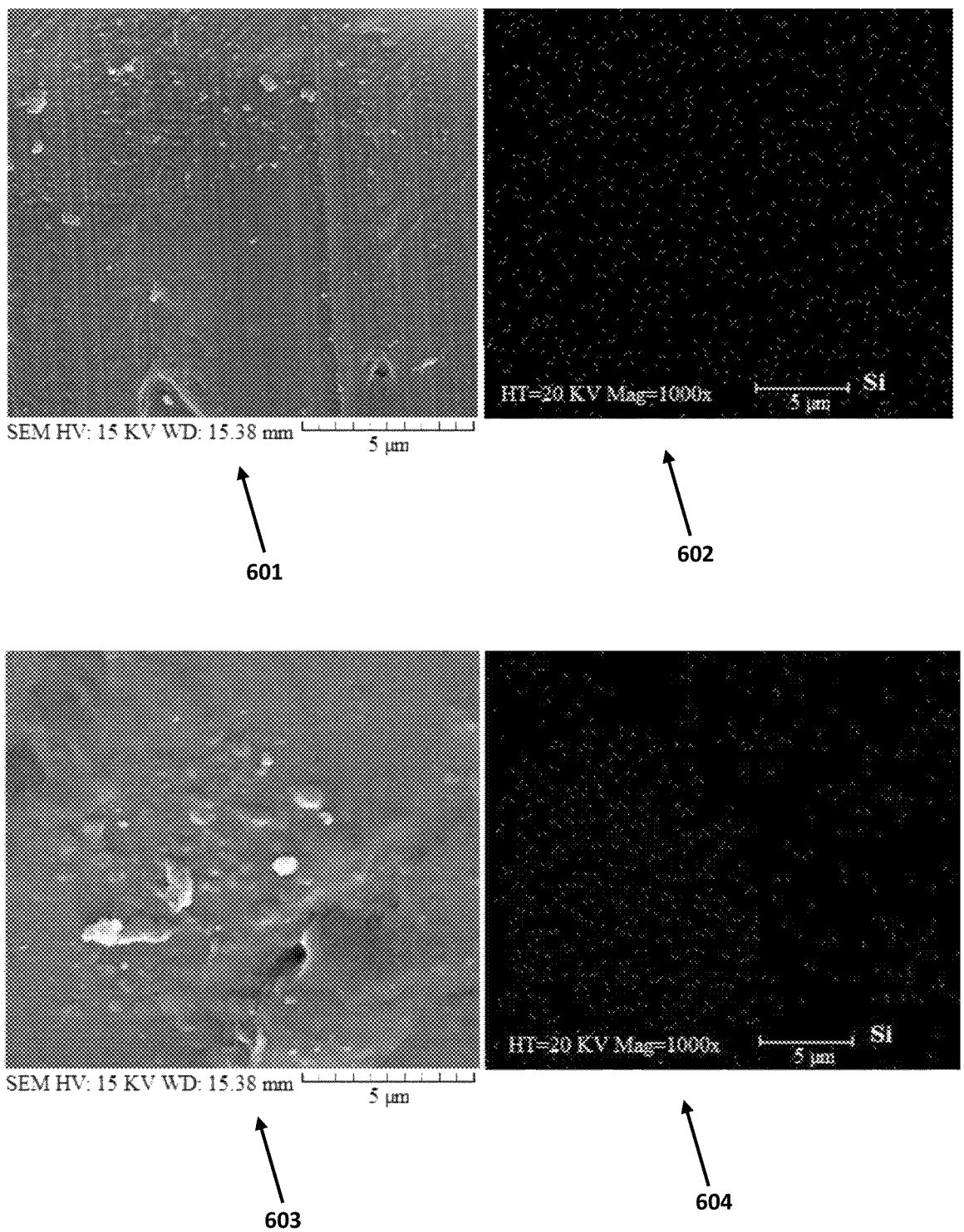
FIG. 6 shows SEM-EDX images of $SBA_9$-$PMC_{63}$ and $SBA_{13}$-$PMC_{63}$, according to one implementation of the present disclosure.

FIG. 6 shows SEM-EDX images 601 and 602 of SBA$_9$-PMC$_{63}$ and SEM-EDX images 603 and 604 of SBA$_{13}$-PMC$_{63}$. Referring to image 602, mesoporous SBA-15-Ph-SO$_3$H has a homogenous distribution in the cross-section of SBA$_9$-PMC$_{63}$ composite membrane. In contrast, referring to image 604, significant agglomerations of Si particles are noticeably observable in the SBA$_{13}$-PMC$_{63}$ composite membrane. Thus, it can be understood that images 602 and 604 support that aggregation of the Si particles happens at high content of mesoporous SBA-15-Ph-SO$_3$H. The self-aggregate of Si particles leads to a decrease in the active surface area of the SBA-15-Ph-SO$_3$H and consequently the proton conductivity is decreased in SBA$_{13}$-PMC$_{63}$ in comparison with SBA$_9$-PMC$_{63}$.

As mentioned before, the composite membranes SBA$_{11}$-PPDC$_{34}$, SBA$_9$-PPDC$_{64}$, SBA$_9$-PPMC$_{63}$ and SBA$_7$-PPMC$_{43}$ were doped with PA by immersion in an aqueous PA solution with a concentration of 85 wt % for 5 days. Afterwards, the composite membranes were dried with a blotting paper and finally evacuated at 80° C. for at least 24 h. The PA doping level (designated herein by PA$_{dop}$) of membranes was defined as moles of PA obtained for 1 mol of each repeat unit of PBI, and was calculated using equation (1) below:

$$PA_{dop} = \frac{[(W_1 - W_0)/98]}{[W_0/308]} \quad \text{Equation (1)}$$

Where W$_0$ is total weight of a dry composite membrane, W$_1$ is the weight of a PA-PBI membrane, and the values 98 and 308 are the molecular weights of PA and a PBI repeat unit, respectively.

Figure 7:
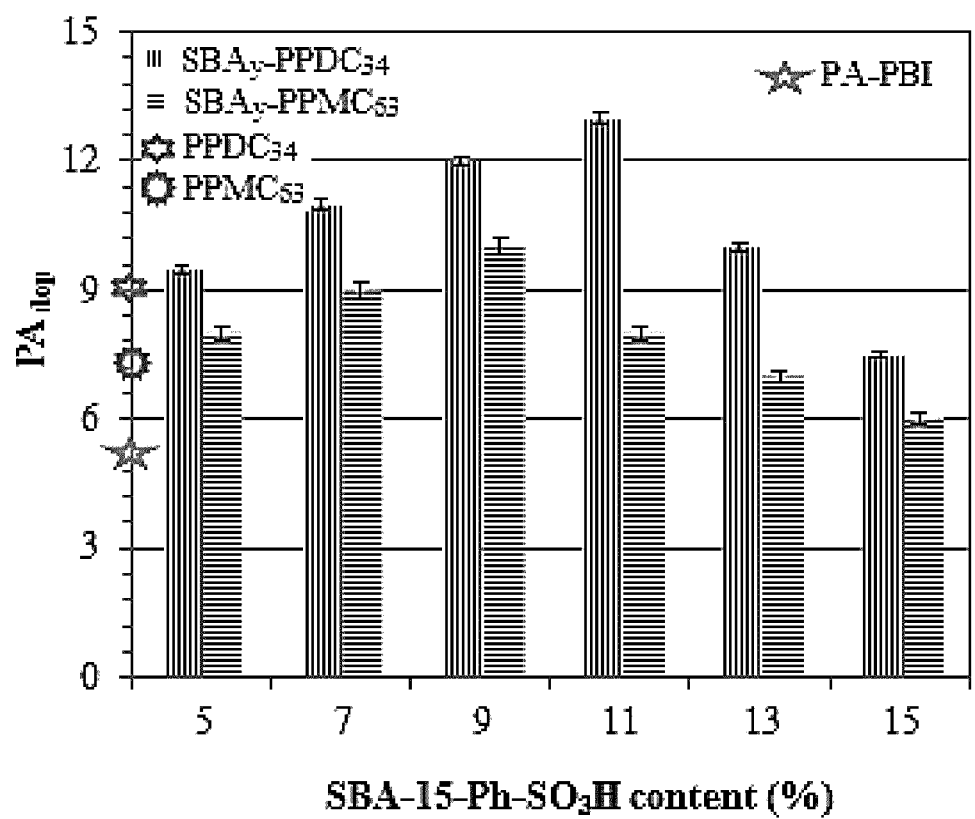
FIG. 7 shows $PA_{dop}$ versus SBA-15-Ph-$SO_3H$ content plots of $SBA_y$-$PPDC_{34}$, $SBA_y$-$PPMC_{63}$, PA-PBI, $PPDC_{34}$, and $PPMC_{63}$ composite membranes, according to one or more implementations of the present disclosure.

In FIG. 7, PA$_{dop}$ versus SBA-15-Ph-SO$_3$H content plots of SBA$_y$-PPDC$_{34}$ and SBA$_y$-PPMC$_{63}$ composite membranes and PA-PBI, PPDC$_{34}$ and PPMC$_{63}$ composite membranes are shown. Referring to FIG. 7, it can be observed that by incorporation of ILs and mesoporous SBA-15-Ph-SO$_3$H in composite membranes, the PA$_{dop}$ of SBA$_y$-PPDC$_{34}$ (up to y=11) and SBA$_y$-PPMC$_{63}$ (up y=9) composite membranes increases. The Ph-SO$_3$H groups of mesoporous SBA-15-Ph-SO$_3$H and TF$_2$N anions of DC$_3$ IL take part in the mechanism of proton transfer and therefore more PA can be absorbed into the composite membranes. Ordered structure of SBA-15-Ph-SO$_3$H mesoporous may increase PA absorption of the composite membranes. Pores of SBA-15-Ph-SO$_3$H mesoporous may adsorb more ionic liquids and PA in the composite membrane structure. The SBA$_{11}$-PPDC$_{34}$ composite membrane shows the highest PA$_{dop}$ (13 mol of PA per mole PBI repeat unit) at dry condition. The results may indicate that DC$_3$ ionic liquid has strong hydrogen bond interactions with mesoporous SBA-15-Ph-SO$_3$H and PA in SBA$_{11}$-PPDC$_{34}$ composite membranes which may lead to an increase in PA$_{dop}$ of the SBA$_{11}$-PPDC$_{34}$ composite membrane.

Figure 8:
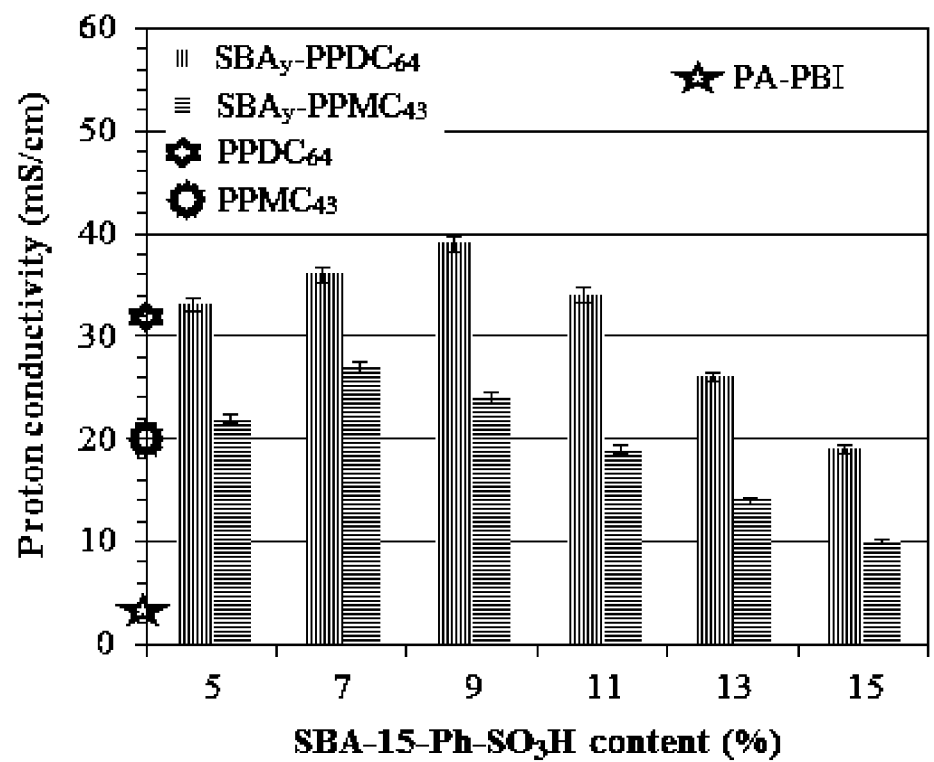
FIG. 8 is a proton conductivity plot of $SBA_y$-$PPDC_{64}$, $SBA_y$-$PPMC_{43}$, PA-PBI, $PPDC_{64}$, and $PPMC_{43}$ composite membranes versus SBA-15-Ph-$SO_3H$ content, according to one or more implementations of the present disclosure.

FIG. 8 is a proton conductivity plot of SBA$_y$-PPDC$_{64}$ and SBA$_y$-PPMC$_{43}$ composite membranes and PA-PBI, PPDC$_{64}$ and PPMC$_{43}$ composite membranes versus SBA-15-Ph-SO$_3$H content which is represented herein by y. The SBA$_y$-PPDC$_{64}$ (up to y=9) and SBA$_y$-PPMC$_{43}$ (up to y=7) composite membranes showed a high proton conductivity compared with PBI membranes. These results may be attributed to high surface area and pores of mesoporous SBA-15-Ph-SO$_3$H. The SBA$_y$-PPDC$_{64}$ composite membrane reflected higher proton conductivity compared to SBA$_y$-PPMC$_{43}$ composite membrane, due to greater hydrogen bond interaction of DC$_6$ ionic liquid. The imidazolium cations in DC$_6$ IL have different positions and numbers of possible hydrogen bonding. The hydrogen bond between the C$_2$ hydrogen atom (the hydrogen atom attached to the single carbon atom bonded to two nitrogen atoms) of an imidazolium cation and PF$_6$ anion has been regarded as an important interaction in controlling the structures and physical properties. The nature of this hydrogen bond is considerably different from that of conventional hydrogen bonds. This interaction is significantly stronger than conventional hydrogen bonds. The size of hydrogen bond is determined mainly by the distance between the imidazolium ring and the anion. The PF$_6$ anions in DC$_6$ IL would make more hydrogen bond interactions with PA and SBA-15-Ph-SO$_3$H and so would increase the proton conductivity of SBA$_y$-PPDC$_{64}$ composite membrane in comparison with SBA$_y$-PPMC$_{43}$ composite membranes. SBA$_9$-PPDC$_{64}$ composite membrane showed the highest proton conductivity (39 mS/cm) in comparison with other SBA$_y$-PPDC$_{64}$ and SBA$_y$-PPMC$_{43}$ composite membranes at 25° C.

Figure 9:
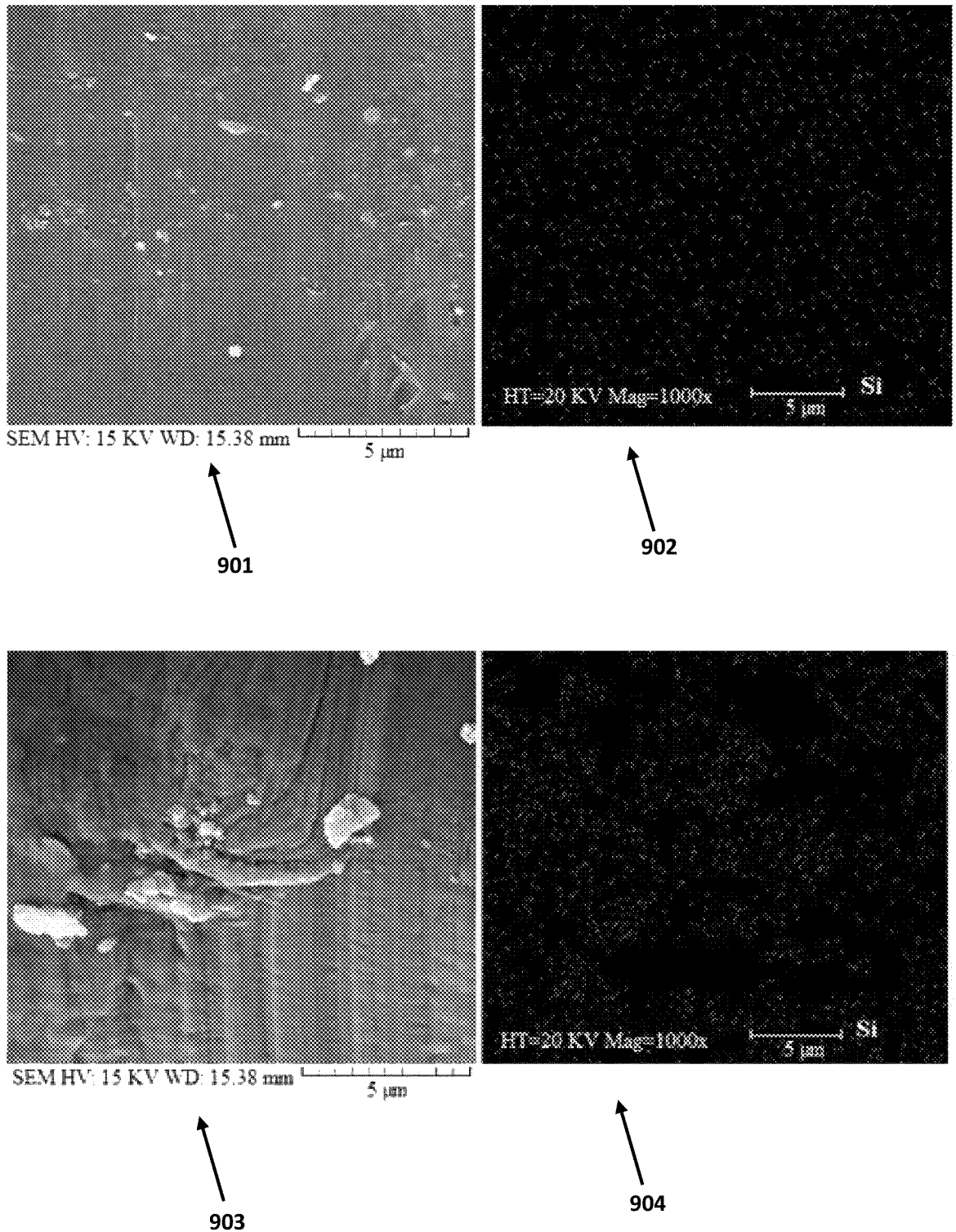
FIG. 9 shows SEM-EDX images of $SBA_9$-$PDC_{64}$ and $SBA_{13}$-$PDC_{64}$, according to one implementation of the present disclosure.

FIG. 9 shows scanning electron microscope with energy dispersive X-ray spectroscope (SEM-EDX) images 901 and 902 of SBA$_9$-PDC$_{64}$ and SEM-EDX images 903 and 904 of SBA$_{13}$-PDC$_{64}$. Referring to image 902, mesoporous SBA-15-Ph-SO$_3$H has a homogenous distribution in the cross-section of SBA$_9$-PDC$_{64}$ composite membrane. In contrast, referring to image 904, significant agglomerations of Si particles are noticeably observable in the SBA$_{13}$-PDC$_{64}$ composite membrane. Images 902 and 904 show that the aggregation of Si particles happens at high content of mesoporous SBA-15-Ph-SO$_3$H. The self-aggregate of Si particles leads to a decrease in the active surface area of the SBA-15-Ph-SO$_3$H and consequently the membrane proton conductivity is decreased.

Figure 10:
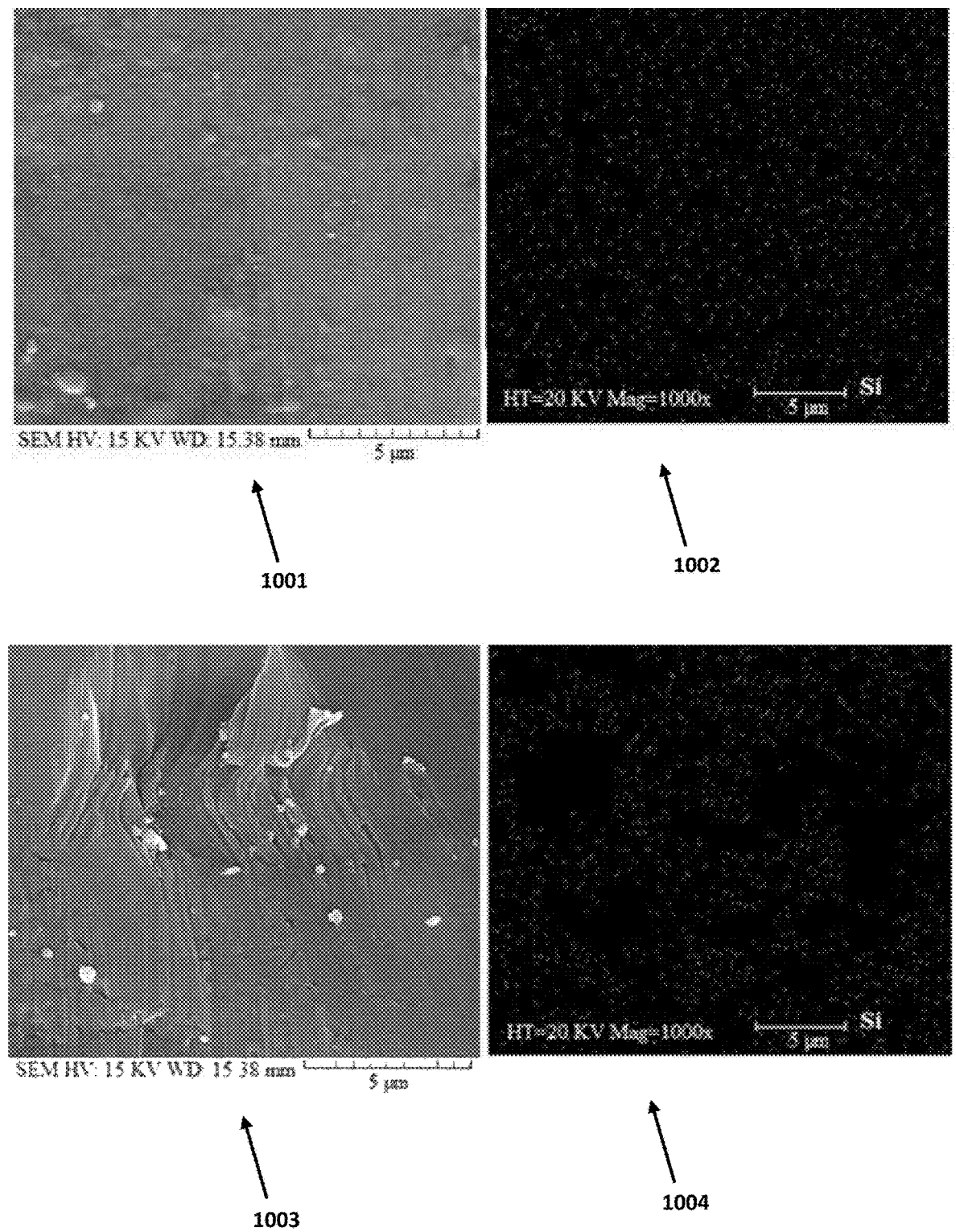
FIG. 10 shows SEM-EDX images of $SBA_7$-$PMC_{43}$ and $SBA_{11}$-$PMC_{43}$, according to one implementation of the present disclosure.

FIG. 10 shows scanning electron microscope with energy dispersive X-ray spectroscope (SEM-EDX) images 1001 and 1002 of SBA$_7$-PMC$_{43}$ and SEM-EDX images 1003 and 1004 of SBA$_{11}$-PMC$_{43}$. Referring to image 1002, mesoporous SBA-15-Ph-SO$_3$H has a homogenous distribution in the cross-section of SBA$_7$-PMC$_{43}$ composite membrane. In contrast, referring to image 1004, significant agglomerations of Si particles are noticeably observable in the SBA$_{11}$-PMC$_{43}$ composite membrane. Images 1002 and 1004 show that the aggregation of Si particles happens at high content of mesoporous SBA-15-Ph-SO$_3$H. The self-aggregate of Si particles leads to a decrease in the active surface area of the SBA-15-Ph-SO$_3$H and consequently the membrane proton conductivity is decreased in SBA$_{11}$-PMC$_{43}$ in comparison with SBA$_7$-PMC$_{43}$.

Figure 11:
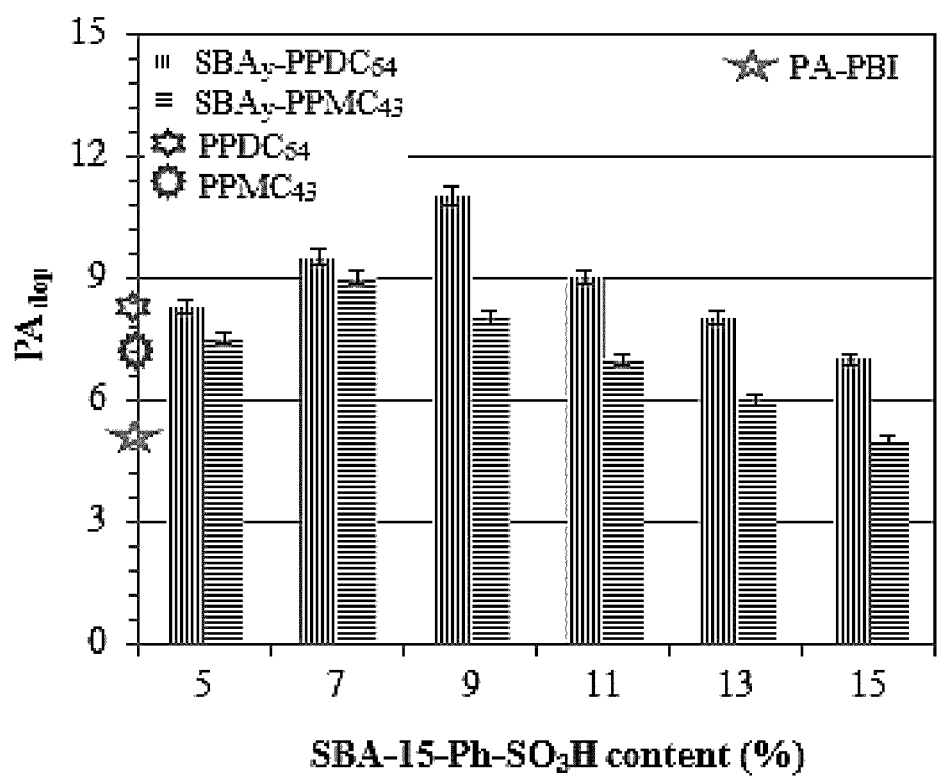
FIG. 11 shows $PA_{dop}$ versus SBA-15-Ph-$SO_3H$ content plots of $SBA_y$-$PPDC_{64}$, $SBA_y$-$PPMC_{43}$, PA-PBI, $PPDC_{64}$, and $PPMC_{43}$ composite membranes, according to one or more implementations of the present disclosure.

FIG. 11 shows PA$_{dop}$ versus SBA-15-Ph-SO$_3$H content plots of SBA$_y$-PPDC$_{64}$ and SBA$_y$-PPMC$_{43}$ composite membranes and PA-PBI, PPDC$_{64}$ and PPMC$_{43}$ composite membranes. SBA$_y$-PPDC$_{64}$ composite membranes showed higher PA$_{dop}$ compared to SBA$_y$-PPMC$_{43}$ composite membranes. Hydrogen bonds interactions between PA, DC$_6$ ionic liquid and -Ph-SO$_3$H groups of SBA-15-Ph-SO$_3$H mesoporous act as a continuous path for absorption of PA in the SBA$_y$-PPDC$_{64}$ composite membranes. SBA$_9$-PPDC$_{64}$ composite membranes showed the highest PA$_{dop}$ (11 mol).

Figure 12A:
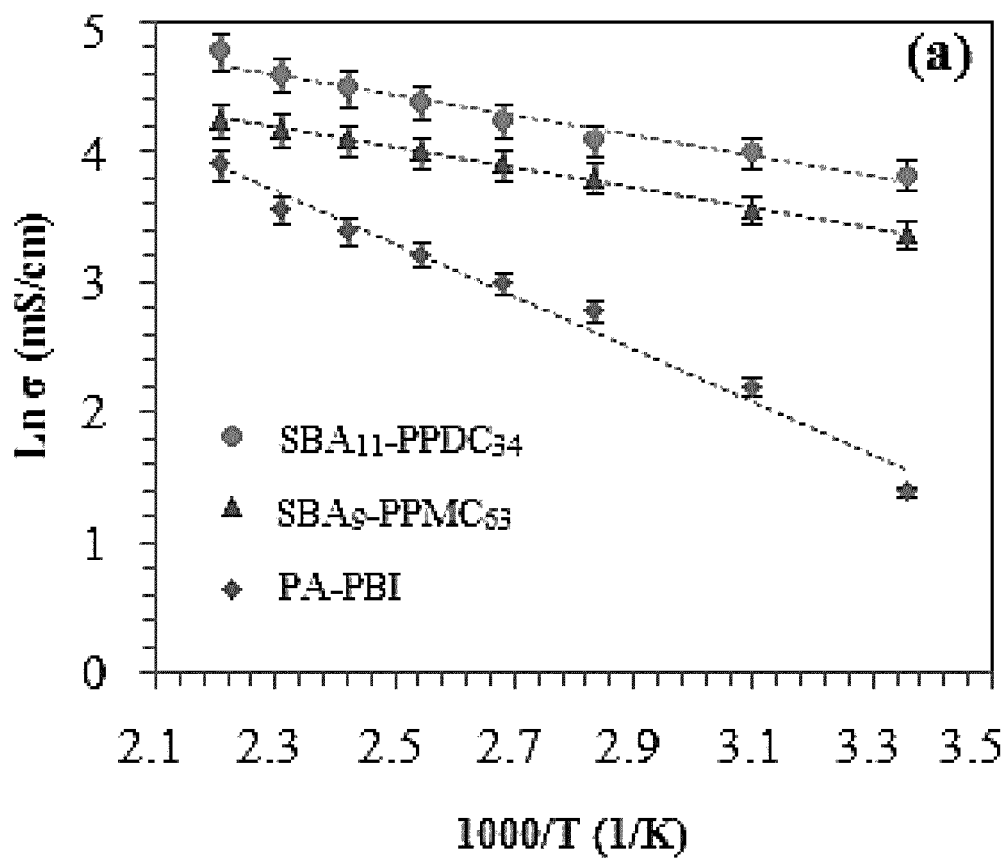
FIG. 12A shows Arrhenius plots of $SBA_{11}$-$PPDC_{34}$ and $SBA_9$-$PPMC_{63}$ composite membranes, according to one implementation of the present disclosure.

FIG. 12A shows Arrhenius plots of SBA$_{11}$-PPDC$_{34}$ and SBA$_9$-PPMC$_{63}$ composite membranes. The SBA$_{11}$-PPDC$_{34}$ composite membranes showed higher proton conductivities in different temperatures in comparison with SBA$_9$-PPMC$_{63}$ composite membranes. The proton conductivity of SBA$_{11}$-PPDC$_{34}$ composite membranes were about 123 mS/cm at 180° C., which may be considered a significant increase in proton conductivity.

Figure 12B:
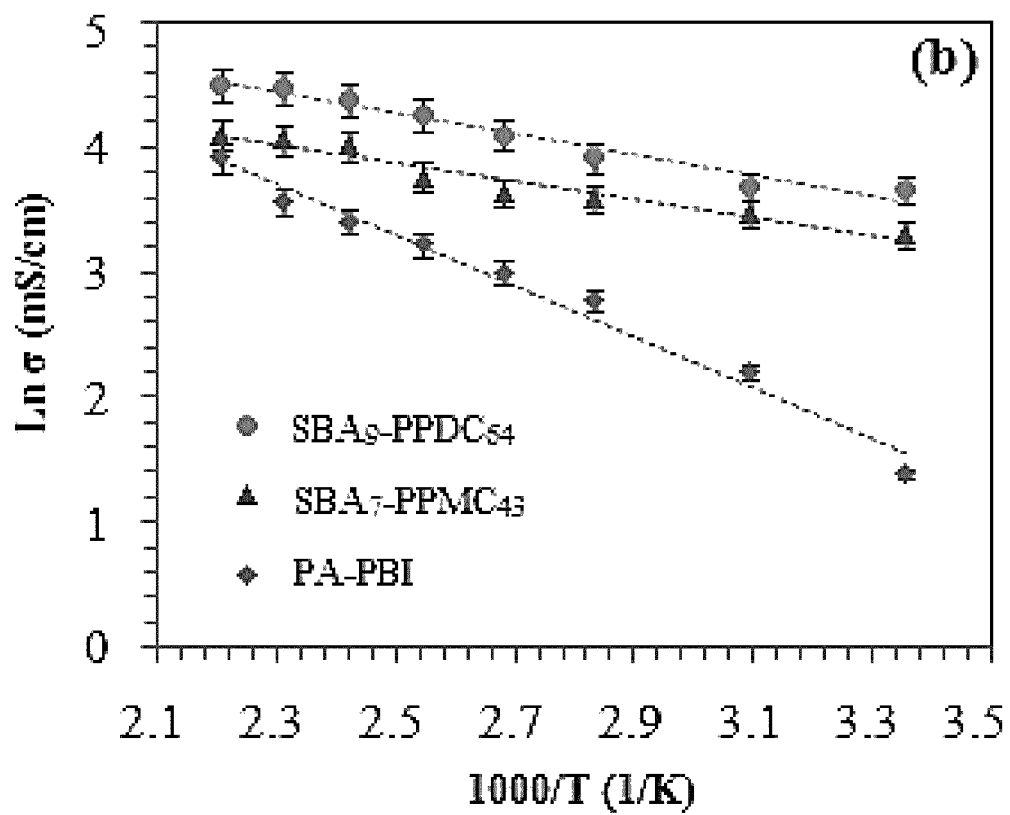
FIG. 12B shows Arrhenius plots of $SBA_9$-$PPDC_{64}$ and $SBA_7$-$PPMC_{43}$ composite membranes, according to one implementation of the present disclosure.

FIG. 12B shows Arrhenius plots of SBA$_9$-PPDC$_{64}$ and SBA$_7$-PPMC$_{43}$ composite membranes. The SBA$_9$-PPDC$_{64}$ composite membranes displayed high proton conductivity in deferent temperature compared with SBA$_7$-PPMC$_{43}$ composite membranes. The proton conductivity of composite membranes increases with increasing temperature. An increase in proton conductivity at high temperatures in composite membranes is due to an increase in transfer kinetics with increasing temperature. The lower activation energy for proton transfer can increase proton transfer speed in high-temperature. The pores of SBA-15-Ph-SO$_3$H mesoporous act as continuous ion channels of protons in high temperatures in the presence of dicationic ionic liquids. The proton conductivity of SBA$_9$-PPDC$_{64}$ composite membranes obtained 90 mS/cm at 180° C.

Referring to FIGS. 12A and 12B, the activation energies (E$_a$) for the proton transport in composite membranes calculated from the slope of the Arrhenius plots, ln(σ) versus 1000/T (K) are presented. Furthermore, Table 1 below reports activation energies of composite membranes. The activation energy of cationic dicationic composite membranes (SBA$_{11}$-PPDC$_{34}$ and SBA$_9$-PPDC$_{64}$) was less than that of monocationic composite membranes (SBA$_9$-PPMC$_{63}$ and SBA$_7$-PPMC$_{43}$). The results showed that the activation energies for proton transfer in dicationic composite membranes were less than monocationic composite membranes. As a result, proton transfers speeds were more in dicationic composite membranes. According to Table 1, the activation energies were the range of 14-21 kJmol$^{-1}$ in composite membranes. The results show that the dominant mechanism of composite membranes for proton transfer is the mutation mechanism.

TABLE 1

| | Activation energies of dicationic and monocationic composite membranes | | | |
|---|---|---|---|---|
| Membrane | SBA$_{11}$-PPDC$_{34}$ | SBA$_9$-PPMC$_{63}$ | SBA$_9$-PPDC$_{64}$ | SBA$_7$-PPMC$_{43}$ |
| E$_a$ (kJ/mol) | 14.13 | 18.19 | 16.56 | 20.15 |

Figure 13A:
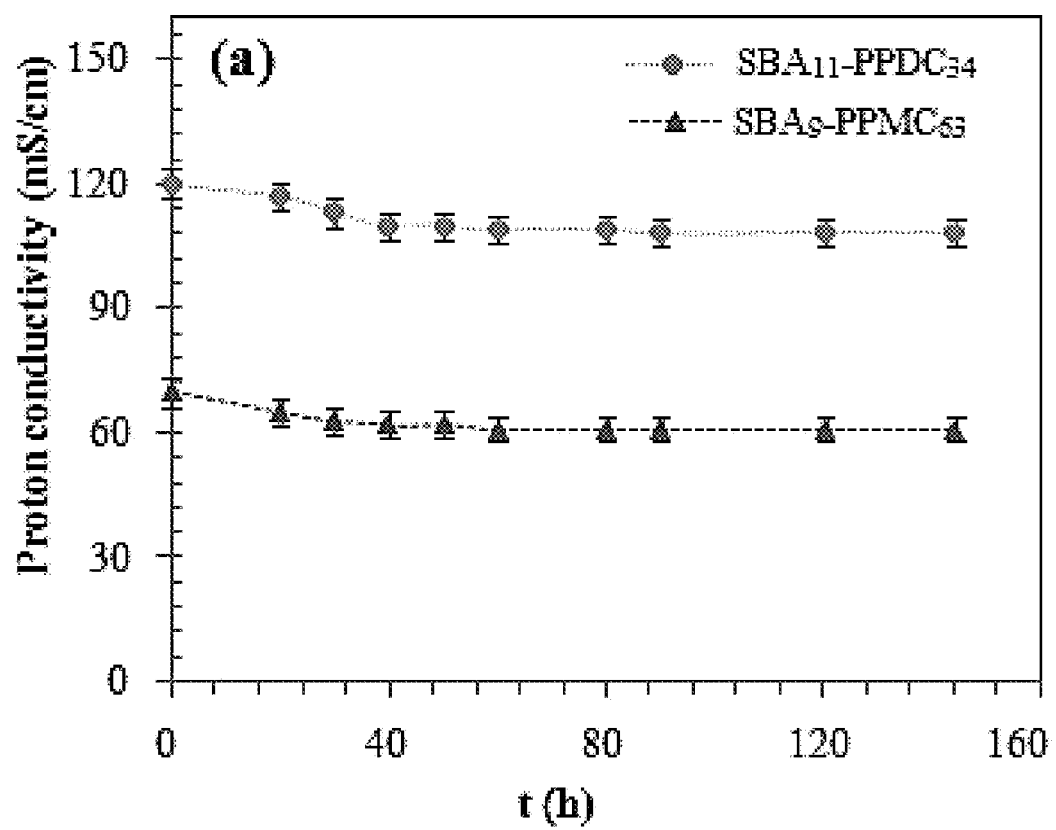
FIG. 13A shows time stability plot of proton conductivity for $SBA_{11}$-$PPDC_{34}$ and $SBA_9$-$PPMC_{63}$ at 180° C., according to one implementation of the present disclosure.
Figure 13B:
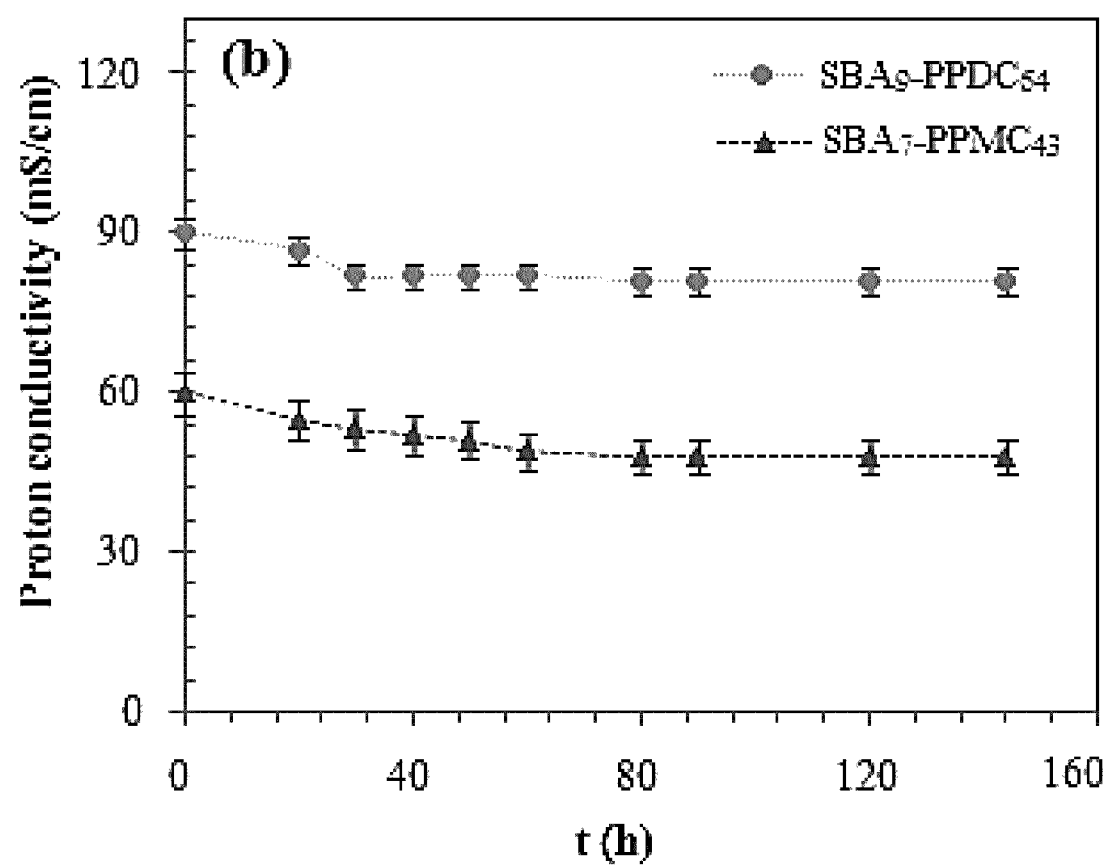
FIG. 13B shows time stability plot of proton conductivity for $SBA_9$-$PPDC_{64}$ and $SBA_7$-$PPMC_{43}$ at 180° C., according to one implementation of the present disclosure.

FIG. 13A shows time stability plot of proton conductivity for SBA$_{11}$-PPDC$_{34}$ and SBA$_9$-PPMC$_{63}$ at 180° C. and FIG. 13B shows time stability plot of proton conductivity for SBA$_9$-PPDC$_{64}$ and SBA$_7$-PPMC$_{43}$ at 180° C. The proton conductivity of composite membranes was investigated at 180° C., and it was kept overnight at 150° C. The proton conductivity of composite membranes remained almost constant for the duration of 144 hours and very little reduction was observed. This phenomenon is due to the presence of SBA-15-Ph-SO$_3$H mesoporous in the structure of composite membranes. The pores of the SBA-15-Ph-SO$_3$H mesoporous have an important role in the prevention of leaching of ionic liquids in composite membranes. These pores provide high surface to maintain the ionic liquids and PA in the structure of composite membranes. At high temperatures, the presence of SBA-15-Ph-SO$_3$H mesoporous in composite membranes leads to a significant increase in proton conductivity. The reason for this view is that the SBA-15-Ph-SO$_3$H mesoporous provides continuous path for proton transfer at high temperatures. The -Ph-SO$_3$H groups play an important role in the formation of hydrogen bonds in proton transfer process. SBA$_{11}$-PPDC$_{34}$ and SBA$_9$-PPDC$_{64}$ dicationic composite membranes displayed less reduction of proton conductivity compared with SBA$_9$-PPMC$_{63}$ and SBA$_7$-PPMC$_{43}$ monocationic composite membranes. This can be understood to be a result of the effective hydrogen bond interactions of dicationic ionic liquid (DC$_3$ and DC$_6$) with SBA-15-Ph-SO$_3$H mesoporous compared with monocationic ionic liquids (MC$_6$ and MC$_4$) in dicationic composite membranes. The presence SBA-15-Ph-SO$_3$H mesoporous in dicationic composite membranes which have a high charge density, provides high hydrogen bond interactions for maintain PA and ionic liquids.

Figure 14A:
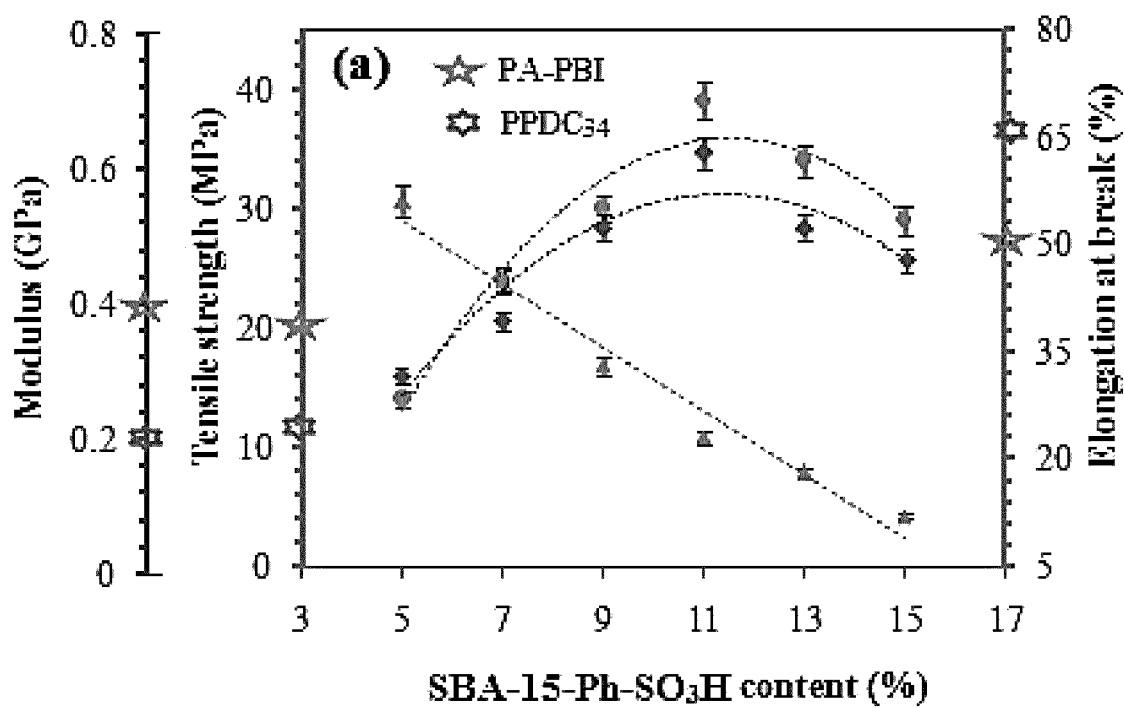
FIG. 14A shows mechanical stability plots for $SBA_y$-$PPDC_{34}$ composite membrane, according to one implementation of the present disclosure.
Figure 14B:
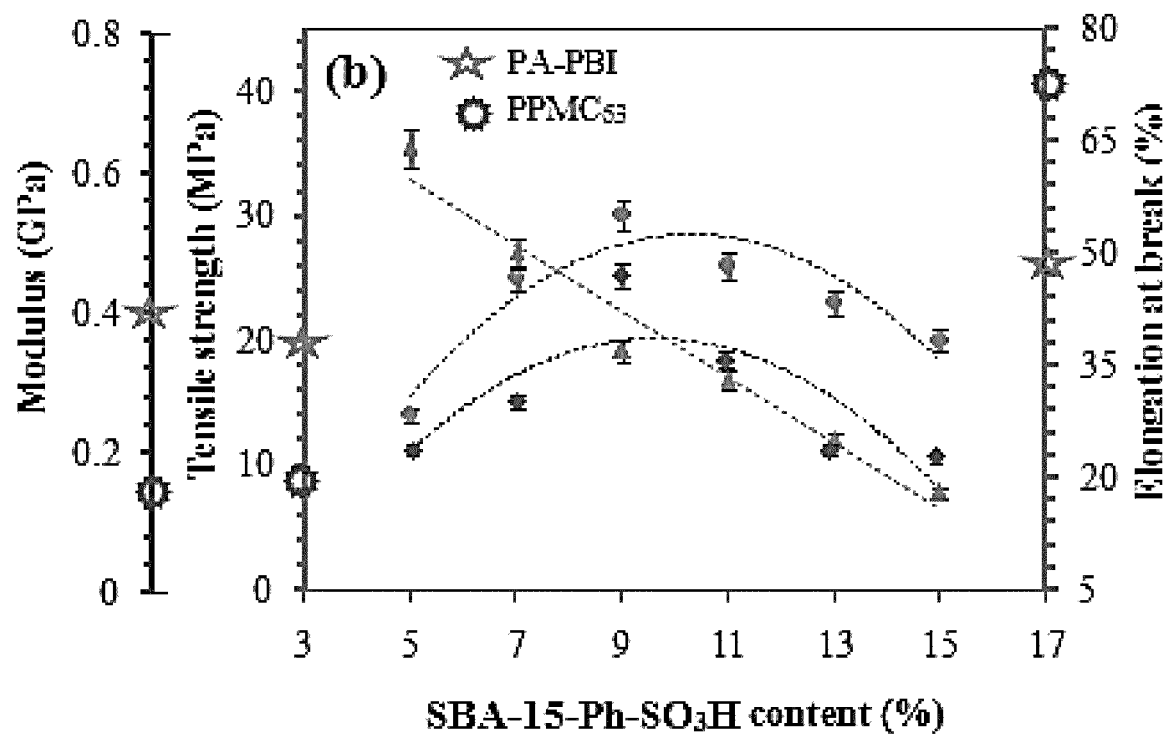
FIG. 14B shows mechanical stability plots for $SBA_y$-$PPMC_{63}$ composite membrane, according to one implementation of the present disclosure.

FIG. 14A shows mechanical stability plots for SBA$_y$-PPDC$_{34}$ composite membrane and FIG. 14B shows mechanical stability plots for SBA$_y$-PPMC$_{63}$ composite membrane. Mechanical stability of SBA$_y$-PPDC$_{34}$ and SBA$_y$-PPMC$_{63}$ composite membranes increased with incorporation of SBA-15-Ph-SO$_3$H mesoporous. This phenomenon is due to the hydrogen bond interactions of SBA-15-Ph-SO$_3$H mesoporous with Ils in the membrane matrix. SBA-15-Ph-SO$_3$H mesoporous with high surface to volume ratio have a greater possibility of interactions with membrane matrix.

Referring to FIGS. 14A and 14B, with the addition of SBA-15-Ph-SO$_3$H mesoporous in composite membrane, which create hydrogen bonds between the SBA-15-Ph-SO$_3$H mesoporous, ionic liquids and membrane, the membrane structure became more compact and the mechanical strength and module of the membrane was improved. Improving the mechanical strength of composite membranes by increasing hydrogen bonds decreases the amount of freedom and mobility of polymer chains in the membrane.

Decreased mobility of polymer chains in the membranes has a direct impact on the elongation of the membrane. The decreased mobility of polymer chains further causes a reduction of the elongation of the membrane and so the membrane becomes more rigid. The $SBA_y$-$PPDC_{34}$ composite membranes displayed high mechanical stability compared with $SBA_y$-$PPMC_{63}$ composite membranes, which can be understood to result from the high interactions between SBA-15-Ph-$SO_3$H mesoporous and $DC_3$ ionic liquid. Uniform dispersion of SBA-15-Ph-$SO_3$H mesoporous is an important factor in these interactions. Hence $SBA_{11}$-$PPDC_{34}$ composite membranes due to homogenous dispersion of SBA-15-Ph-$SO_3$H mesoporous demonstrated high mechanical stability compared with others $SBA_y$-$PPDC_{34}$ composite membranes.

Figure 15A:
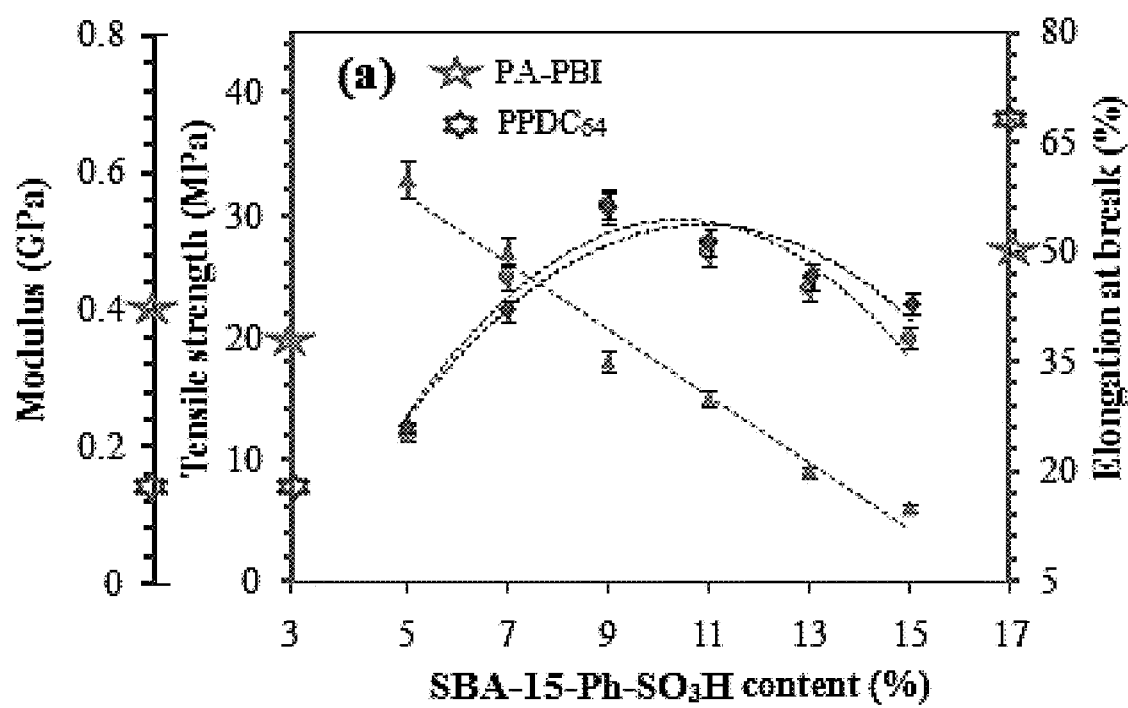
FIG. 15A shows mechanical stability plots for $SBA_y$-$PPDC_{64}$ composite membrane, according to one implementation of the present disclosure.
Figure 15B:
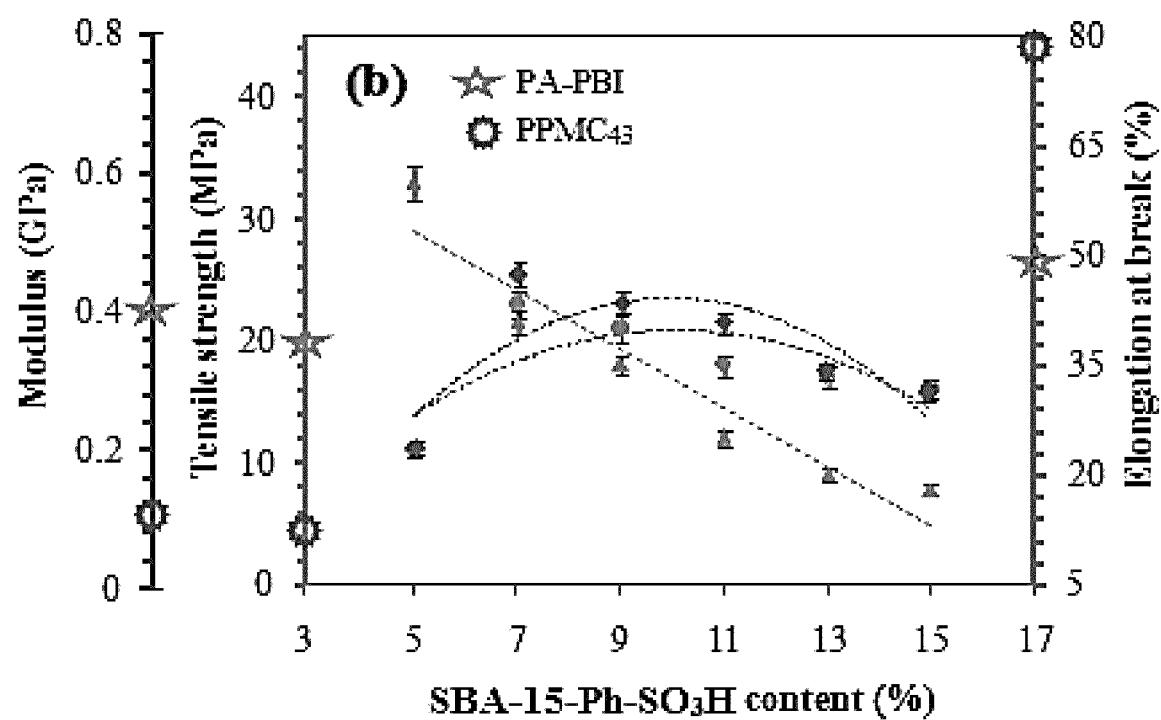
FIG. 15B shows mechanical stability plots for $SBA_y$-$PPMC_{43}$ composite membrane, according to one implementation of the present disclosure.

FIG. 15A shows mechanical stability plots for $SBA_y$-$PPDC_{64}$ composite membrane and FIG. 15B shows mechanical stability plots for $SBA_y$-$PPMC_{43}$ composite membrane. $SBA_y$-$PPDC_{64}$ composite membranes because of $DC_6$ ionic liquid interactions displayed high mechanical stability compared with $SBA_y$-$PPMC_{43}$ composite membranes. $SBA_9$-$PPDC_{64}$ composite membranes due to homogenous dispersion of SBA-15-Ph-$SO_3$H mesoporous demonstrated high mechanical stability compared with others $SBA_y$-$PPDC_{64}$ composite membranes.

Referring to Table 2 below, the mechanical strengths of dicationic membranes, monocationic membranes, dicationic and monocationic composite membranes are presented. The strong hydrogen bonding between N and —NH— groups is a key factor controlling the mechanical behavior of the PBI. When ionic liquids are introduced into the PBI structure in dicationic membranes ($PPDC_{34}$ and $PPDC_{64}$) and monocationic membranes ($PPMC_{63}$ and $PPMC_{43}$), the molecular cohesion between PBI chains is decreased. However, the hydrogen bonds between nitrogen atoms and $DC_3$ ionic liquid would increase the cohesion. As a result of these opposite effects, no important change of modulus or tensile strength of the PBI membranes is observed.

TABLE 2

Mechanical strength of dicationic membranes, monocationic membranes, and dicationic and monocationic composite membranes.

| Membranes | Tensile strength (MPa) | Modulus (GPa) | Elongation at break (%) |
|---|---|---|---|
| PA-PBI | 14 | 0.4 | 50 |
| $PPDC_{34}$ | 8 | 0.2 | 65 |
| $SBA_{11}$-$PPDC_{34}$ | 34 | 0.55 | 23 |
| $PPDC_{64}$ | 7 | 0.15 | 67 |
| $SBA_9$-$PPDC_{64}$ | 29 | 0.5 | 35 |
| $PPMC_{63}$ | 6 | 0.14 | 74 |
| $SBA_9$-$PPMC_{63}$ | 29 | 0.45 | 37 |
| $PPMC_{43}$ | 5 | 0.11 | 78 |
| $SBA_7$-$PPMC_{43}$ | 18 | 0.43 | 41 |

Dicationic and monocationic composite membranes displayed high mechanical stability compared with dicationic and monocationic membranes. This result may be attributed to high interface interactions of SBA-15-Ph-$SO_3$H mesoporous with membranes matrix in composite membranes.

The prepared composite membranes and Nafion 117 were used to prepare MEAs. The catalyst was Pt—C(E-TEK, 20 wt % Pt) and the Pt loadings of anode and cathode were 0.5 mg/cm². The MEA of composite membranes was fabricated according to the literature procedure [41]: Pt—C/PBI/LiCl/DMAc (3.6/1/0.2/38 by wt) catalyst solution was prepared by ultrasonic disturbing for 1 h. The catalyst ink was painted onto carbon cloth (E-TEK, HT 2500-W) and dried at 190° C. in a conventional oven. Hot-pressing was performed at 130° C. applying a load of 50 kg/cm² for 5 min. In this example, the MEA of Nafion 117 membrane was fabricated by following procedure: Pt—C was mixed with deionized water, isopropyl alcohol (Sigma-Aldrich) and Nafion solution (5 wt % solution, EW1000, Dupont) to form a catalyst ink. The catalyst ink was painted onto carbon cloth (E-TEK, HT 2500-W) and dried at 80 and 120° C. for 40 and 60 min respectively in a conventional oven. The MEA was made by hot-pressing a sandwich of electrodes and a Nafion 117 membrane at 140° C. for 3 min with a pressure of 50 kg/cm². Prior to the i-V measurement, the MEAs of composite membranes and Nafion 117 were activated.

Figure 16A:
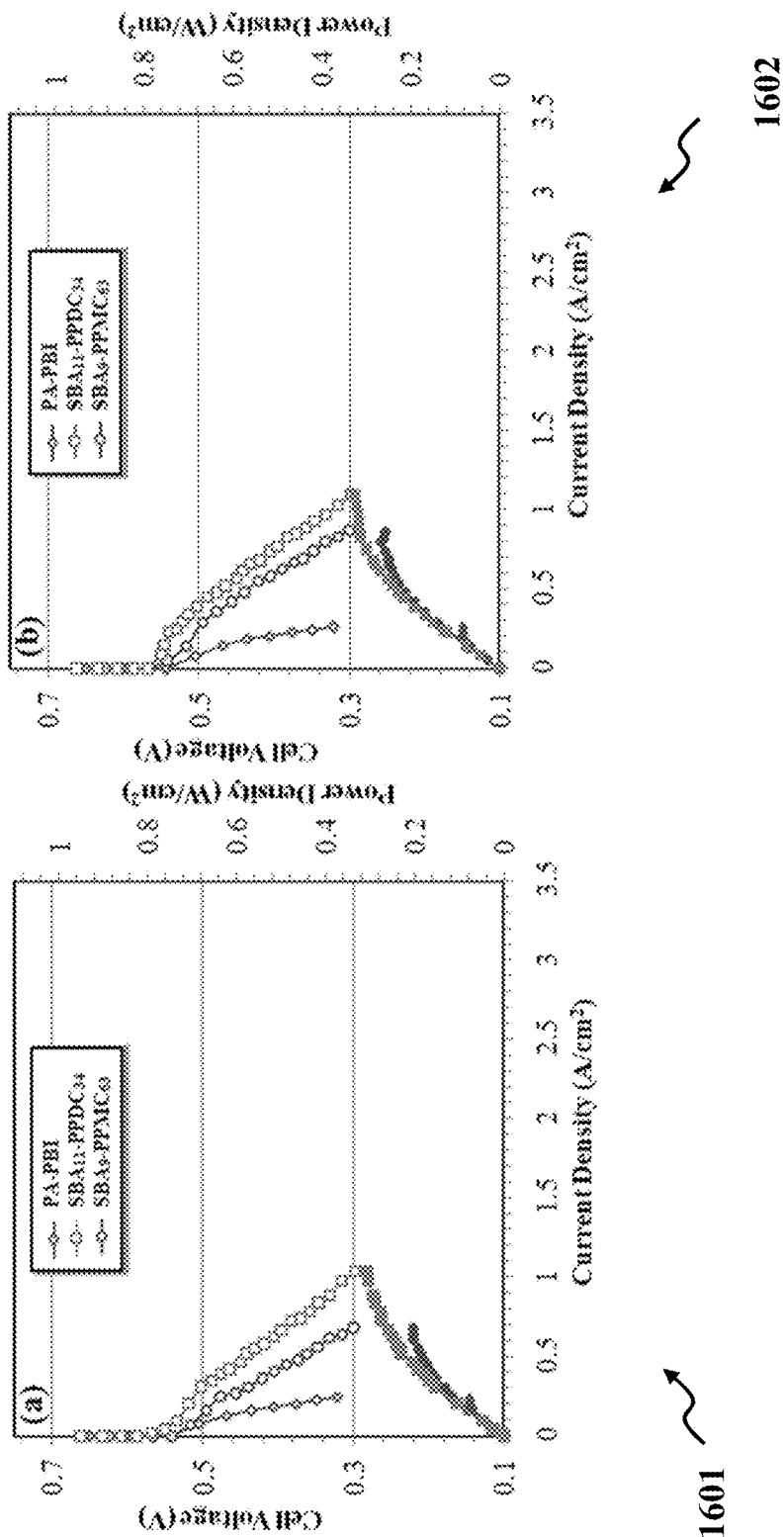
FIGS. 16A-16C show polarization curves of $SBA_{11}$-$PPDC_{34}$ and $SBA_9$-$PPMC_{63}$ composite membranes in the temperature range of 80-180° C., according to one implementation of the present disclosure.
Figure 16B:
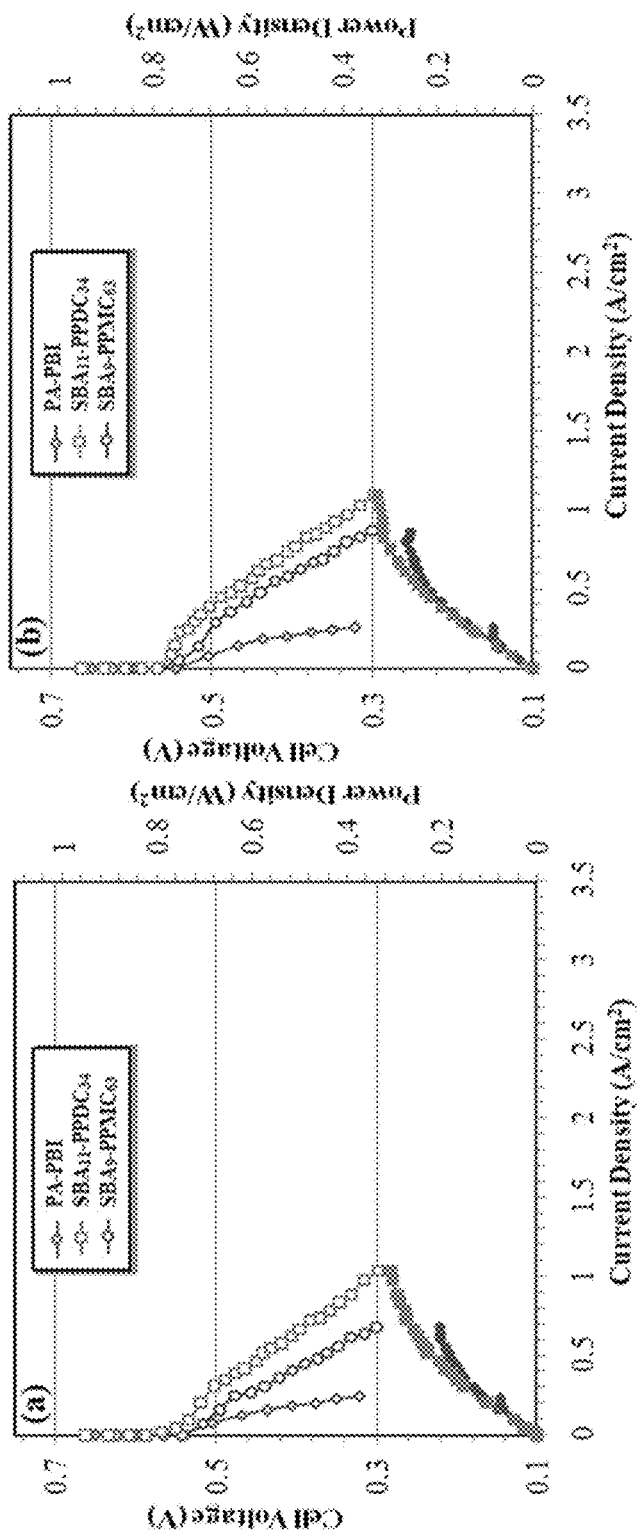
Figure 16C:
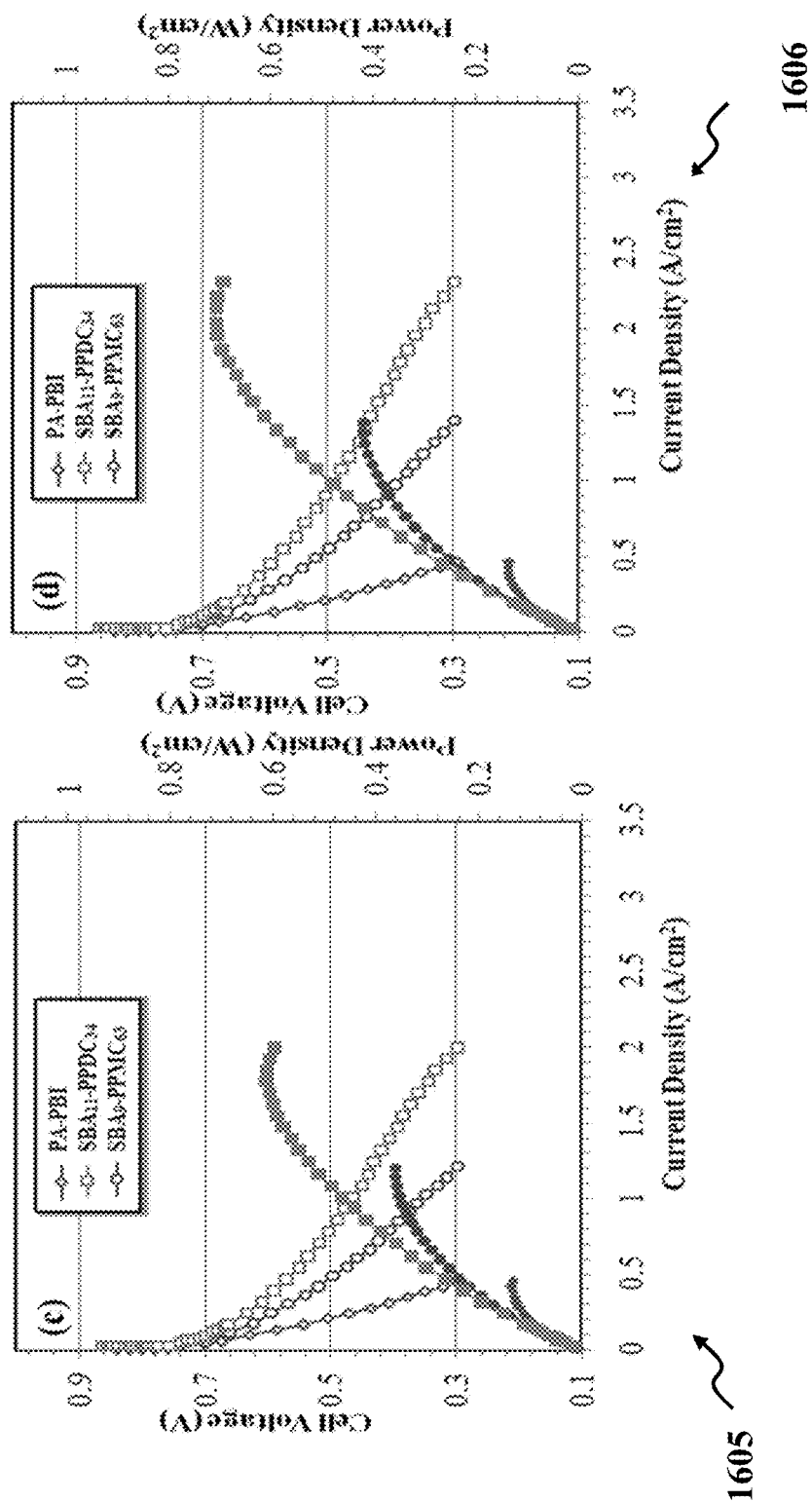
Figure 16D:
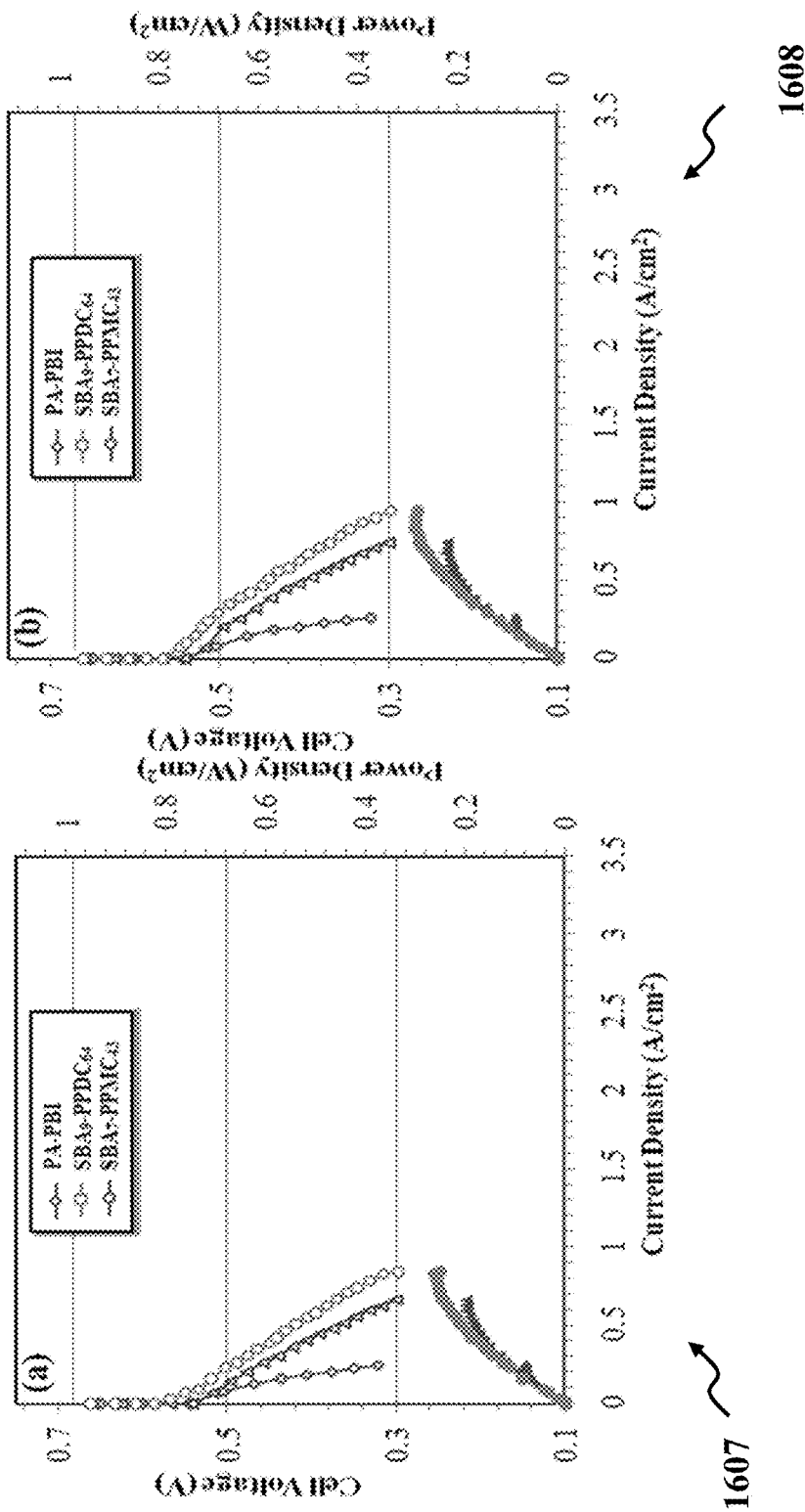
FIG. 16D-16F show polarization curves of $SBA_9$-$PPDC_{64}$ and $SBA_7$-$PPMC_{43}$ composite membranes in the temperature range of 80-180° C., according to one implementation of the present disclosure.
Figure 16E:
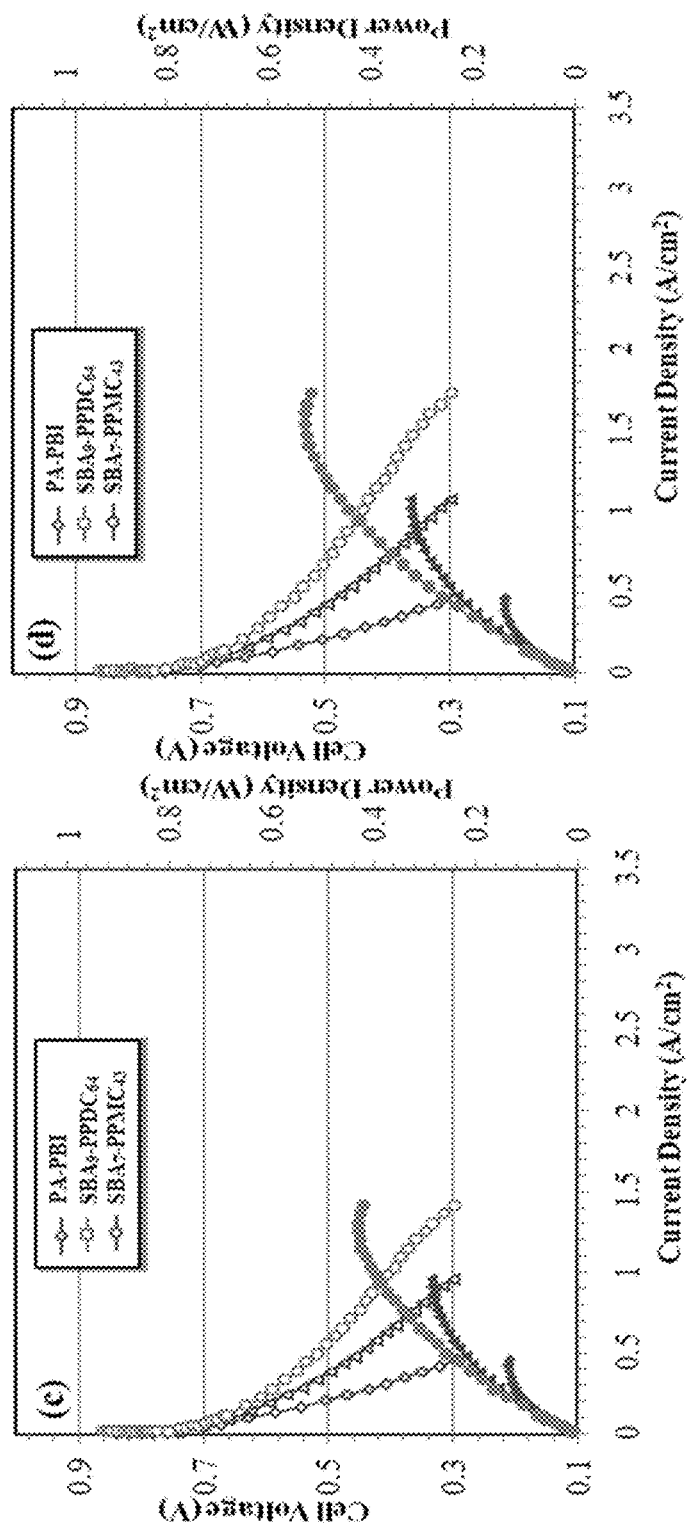
Figure 16F:
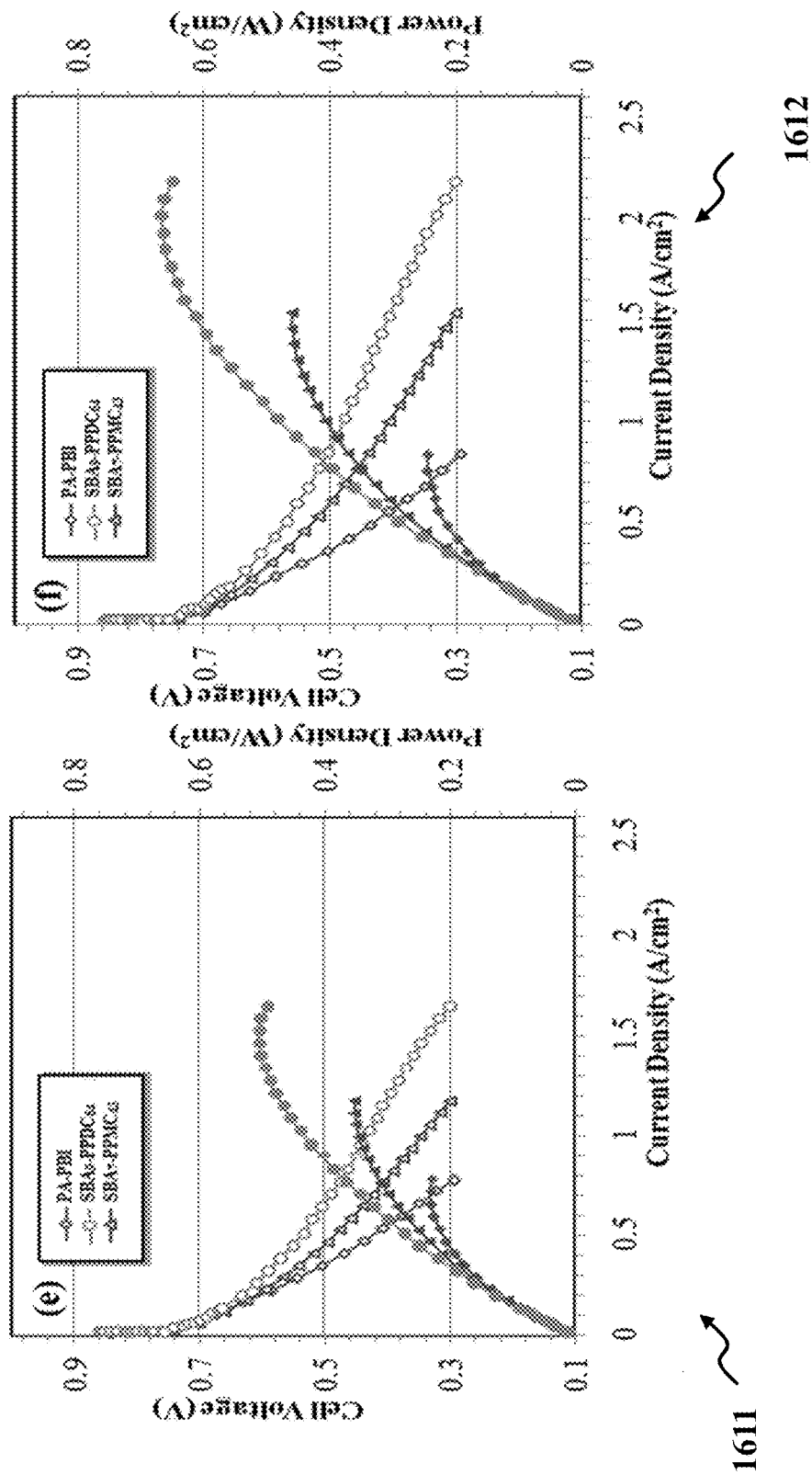

FIGS. 16A-16C show polarization curves of $SBA_{11}$-$PPDC_{34}$ and $SBA_9$-$PPMC_{63}$ composite membranes in the temperature range of 80-180° C. and FIG. 16D-16F show polarization curves of $SBA_9$-$PPDC_{64}$ and $SBA_7$-$PPMC_{43}$ composite membranes in the temperature range of 80-180° C.

Referring to FIG. 16A, polarization curves of $SBA_{11}$-$PPDC_{34}$ and $SBA_9$-$PPMC_{63}$ composite membranes along with PA-PBI membrane at 80° C. are shown in chart 1601, and polarization curves of $SBA_{11}$-$PPDC_{34}$ and $SBA_9$-$PPMC_{63}$ composite membranes along with PA-PBI membrane at 90° C. are shown in chart 1602. In FIG. 16B, polarization curves of $SBA_{11}$-$PPDC_{34}$ and $SBA_9$-$PPMC_{63}$ composite membranes along with PA-PBI membrane at 100° C. are shown in chart 1603, and polarization curves of $SBA_{11}$-$PPDC_{34}$ and $SBA_9$-$PPMC_{63}$ composite membranes along with PA-PBI membrane at 120° C. are shown in chart 1604. In FIG. 16C polarization curves of $SBA_{11}$-$PPDC_{34}$ and $SBA_9$-$PPMC_{63}$ composite membranes along with PA-PBI membrane at 150° C. are shown in chart 1605, and polarization curves of $SBA_{11}$-$PPDC_{34}$ and $SBA_9$-$PPMC_{63}$ composite membranes along with PA-PBI membrane at 180° C. are shown in chart 1606. In this example, the anode and cathode Pt loadings were both 0.5 mg/cm². Each MEA with an active area of 2.3×2.3 cm² underwent the fuel cell test with the $H_2/O_2$ flow rates at 300/500 mL/min under anhydrous condition.

Referring to FIG. 16D, polarization curves of $SBA_9$-$PPDC_{64}$ and $SBA_7$-$PPMC_{43}$ composite membranes along with PA-PBI membrane at 80° C. are shown in chart 1607, and polarization curves of $SBA_9$-$PPDC_{64}$ and $SBA_7$-$PPMC_{43}$ composite membranes along with PA-PBI membrane at 90° C. are shown in chart 1608. In FIG. 16E, polarization curves of $SBA_9$-$PPDC_{64}$ and $SBA_7$-$PPMC_{43}$ composite membranes along with PA-PBI membrane at 100° C. are shown in chart 1609, and polarization curves of $SBA_9$-$PPDC_{64}$ and $SBA_7$-$PPMC_{43}$ composite membranes along with PA-PBI membrane at 120° C. are shown in chart 1610. In FIG. 16F polarization curves of $SBA_9$-$PPDC_{64}$ and $SBA_7$-$PPMC_{43}$ composite membranes along with PA-PBI membrane at 150° C. are shown in chart 1611, and polarization curves of $SBA_9$-$PPDC_{64}$ and $SBA_7$-$PPMC_{43}$ composite membranes along with PA-PBI membrane at 180° C. are shown in chart 1612. In this example, the anode and cathode Pt loadings were both 0.5 mg/cm². Each MEA with an active area of 2.3×2.3 cm² was performed the fuel cell test with the $H_2/O_2$ flow rates at 300/500 mL/min under anhydrous condition.

With further reference to FIGS. 16A-16F, $SBA_{11}$-$PPDC_{34}$ and $SBA_9$-$PPDC_{64}$ composite membranes displayed high fuel cell performance compared with $SBA_9$-$PPMC_{63}$ and $SBA_7$-$PPMC_{43}$ composite membranes due to high proton conductivity. The fuel cell performance of composite membrane increases as the temperature was increased from 80° C. to 180° C. The cause of this phenomenon is high proton conductivity and reaction kinetics of composite membranes at high temperatures. OCV value of composite membranes increased with increasing temperature as a result of confirmation of the applicability of these membranes at high temperatures.

In Table 3 below, fuel cell performance parameters for composite membranes at 180° C. and 0.5 V are presented. The $SBA_{11}$-$PPDC_{34}$ composite membranes showed the highest fuel cell performance. Several factors can contribute to the high fuel cell performance $SBA_{11}$-$PPDC_{34}$ composite membranes, such as high proton conductivity, suitable surface roughness, uniform and high level of SBA-15-Ph-$SO_3$H mesoporous, pores of SBA-15-Ph-$SO_3$H mesoporous, hydrogen interactions of -Ph-$SO_3$H groups with ionic liquids and high proton conductivity life time. Current density for $SBA_{11}$-$PPDC_{34}$ composite membranes at 0.5 V and 80° C. was 0.22 A/cm² (chart 1601). This current density was increased to about 1.16 A/cm² at 180° C. (chart 1606).

TABLE 3

Fuel cell parameters of composite membranes at 180° C. and 0.5 V.

| Membrane | $SBA_7$-$PPMC_{43}$ | $SBA_9$-$PPDC_{64}$ | $SBA_9$-$PPMC_{63}$ | $SBA_{11}$-$PPDC_{34}$ |
|---|---|---|---|---|
| Current density (A/cm²) | 0.65 | 0.91 | 0.72 | 1.16 |
| Power density (W/cm²) | 0.32 | 0.45 | 0.36 | 0.58 |

Figure 17:
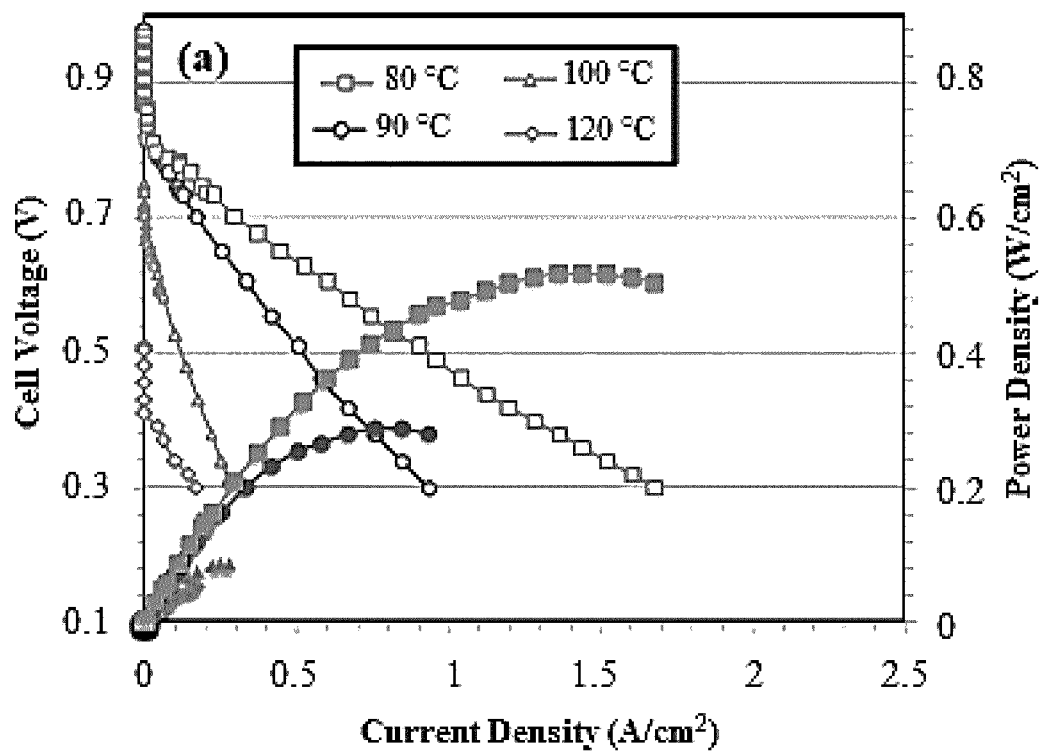
FIG. 17 shows polarization curves for Nafion 117 membrane at 80° C., 90° C., 100° C. and 120° C., according to one implementation of the present disclosure.

FIG. 17 shows polarization curves for Nafion 117 membrane at 80° C., 90° C., 100° C. and 120° C. The anode and cathode Pt loadings were both 0.5 mg/cm². The active area of each MEA was 2.3×2.3 cm². The performance of Nafion 117 is noticeably decreased with increasing temperature from 80° C. to 120° C. This occurs because of the requirement of humidification of Nafion 117 for a good operation. As the relative humidity decreases at higher temperatures, the performance of Nafion 117 MEA would also decrease. FIG. 17 shows that the OCV drops from 0.98 V at 80° C. to a value of only 0.51 V at 120° C. Polarization curves for Nafion 117 at 150° C. and 180° C. could not be obtained due to the absence of moisture. Referring to FIG. 17, the power density of Nafion 117 decreases with increases in temperature due to decreasing relative humidity. However, the power density of PA-PBI, dicationic membranes, monocationic membranes, dicationic and monocationic composite membranes increase with increasing temperature.

Figure 18A:
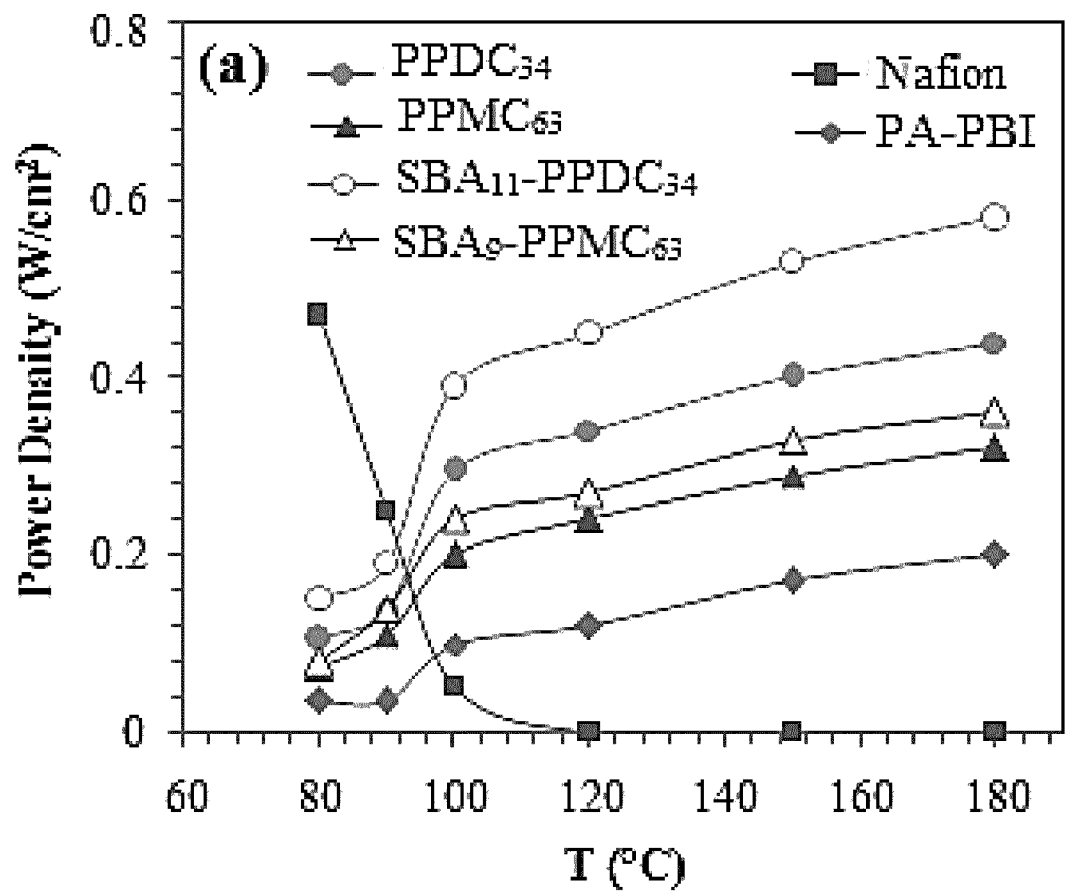
FIG. 18A shows power density plots of $PPDC_{34}$, $PPMC_{63}$, $SBA_{11}$-$PPDC_{34}$, $SBA_9$-$PPMC_{63}$ composite membranes along with power density plots of Nafion and PA-PBI at 0.5 V, according to one implementation of the present disclosure.
Figure 18B:
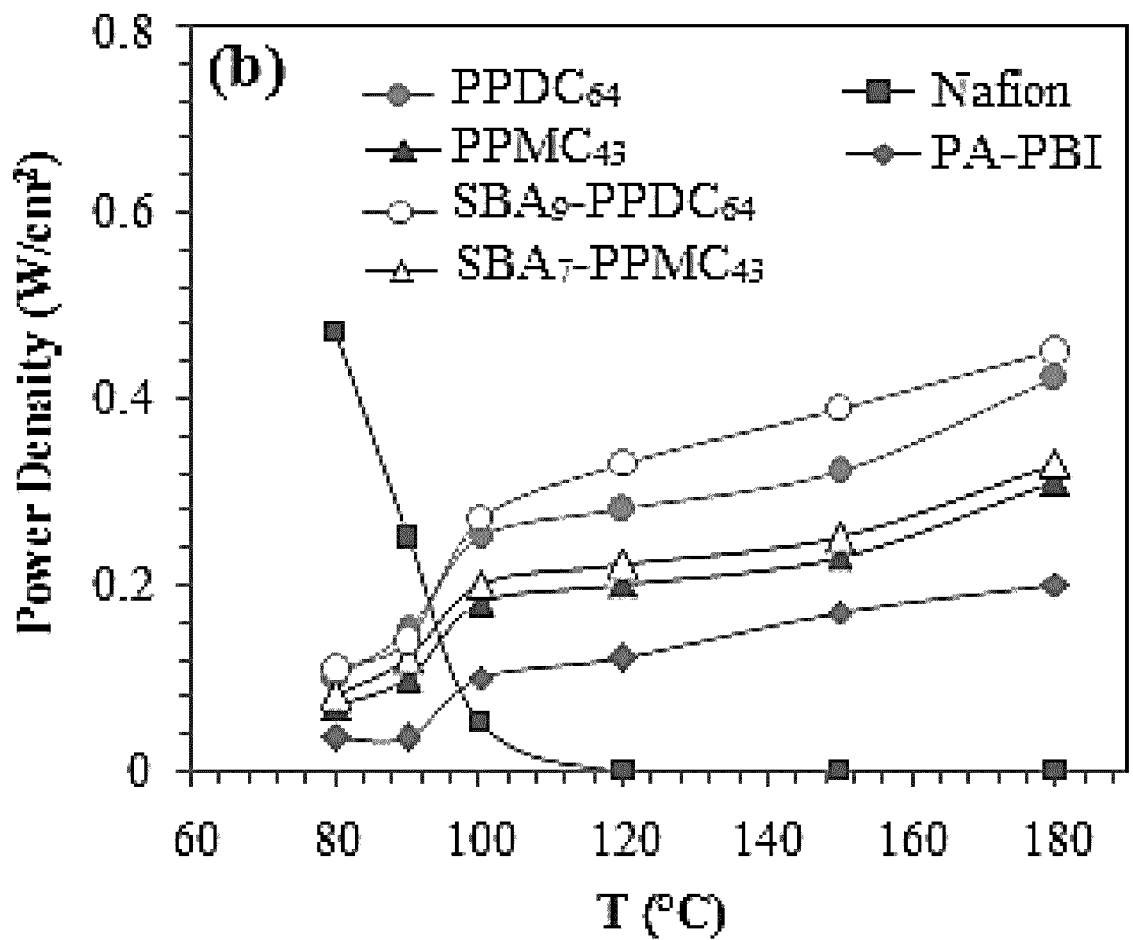
FIG. 18B shows power density plots of $PPDC_{64}$, $PPMC_{43}$, $SBA_9$-$PPDC_{64}$, $SBA_7$-$PPMC_{43}$ composite membranes along with power density plots of Nafion and PA-PBI at 0.5 V, according to one implementation of the present disclosure.

FIG. 18A shows power density plots of $PPDC_{34}$, $PPMC_{63}$, $SBA_{11}$-$PPDC_{34}$, $SBA_9$-$PPMC_{63}$ composite membranes along with power density plots of Nafion and PA-PBI at 0.5 V. FIG. 18B shows power density plots of $PPDC_{64}$, $PPMC_{43}$, $SBA_9$-$PPDC_{64}$, $SBA_7$-$PPMC_{43}$ composite membranes along with power density plots of Nafion and PA-PBI at 0.5 V. Referring to FIGS. 18A and 18B, a similar trend of increase in the monocationic composite membranes ($SBA_9$-$PPMC_{63}$ and $SBA_7$-$PPMC_{43}$) compared to monocationic membranes ($PPMC_{63}$ and $PPMC_{43}$) is observed. This observation is due to the presence of SBA-15-Ph-$SO_3$H mesoporous in the structure of composite membranes. SBA-15-Ph-$SO_3$H mesoporous keep ionic liquids and PA in the structure of the composite membranes due to strong and effective hydrogen interaction. In other words SBA-15-Ph-$SO_3$H mesoporous reduces PA and ionic liquids leaching and to be climbing onto the power density. The $SBA_{11}$-$PPDC_{34}$ dicationic composite membranes displayed power density of 0.58 W/cm² at 180° C. and 0.5 V. These results indicate that the capability of $SBA_{11}$-$PPDC_{34}$ dicationic composite membranes to provide high fuel cell performance for use in high temperature PEM fuel cells.

Figure 19A:
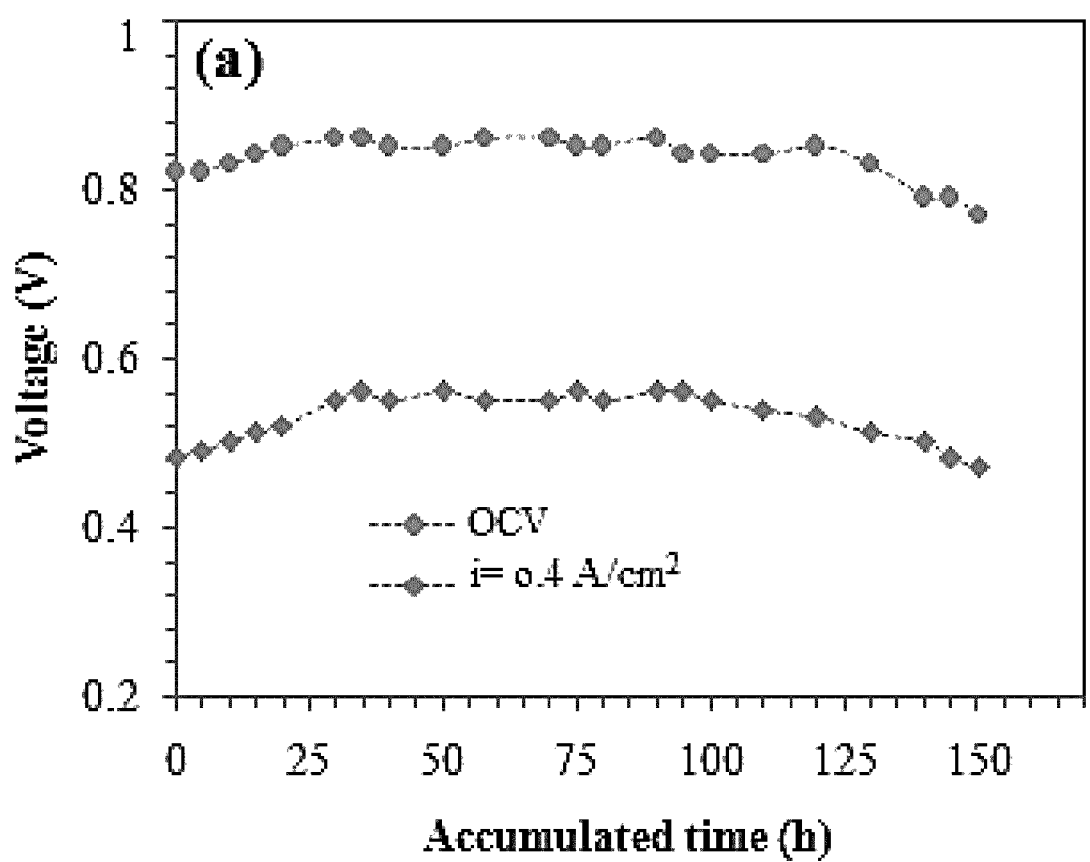
FIG. 19A shows a life test result of $PPDC_{34}$ membrane unit cell operated at 180° C. under a constant current loading of 0.4 A/$cm^2$, according to one implementation of the present disclosure.
Figure 19B:
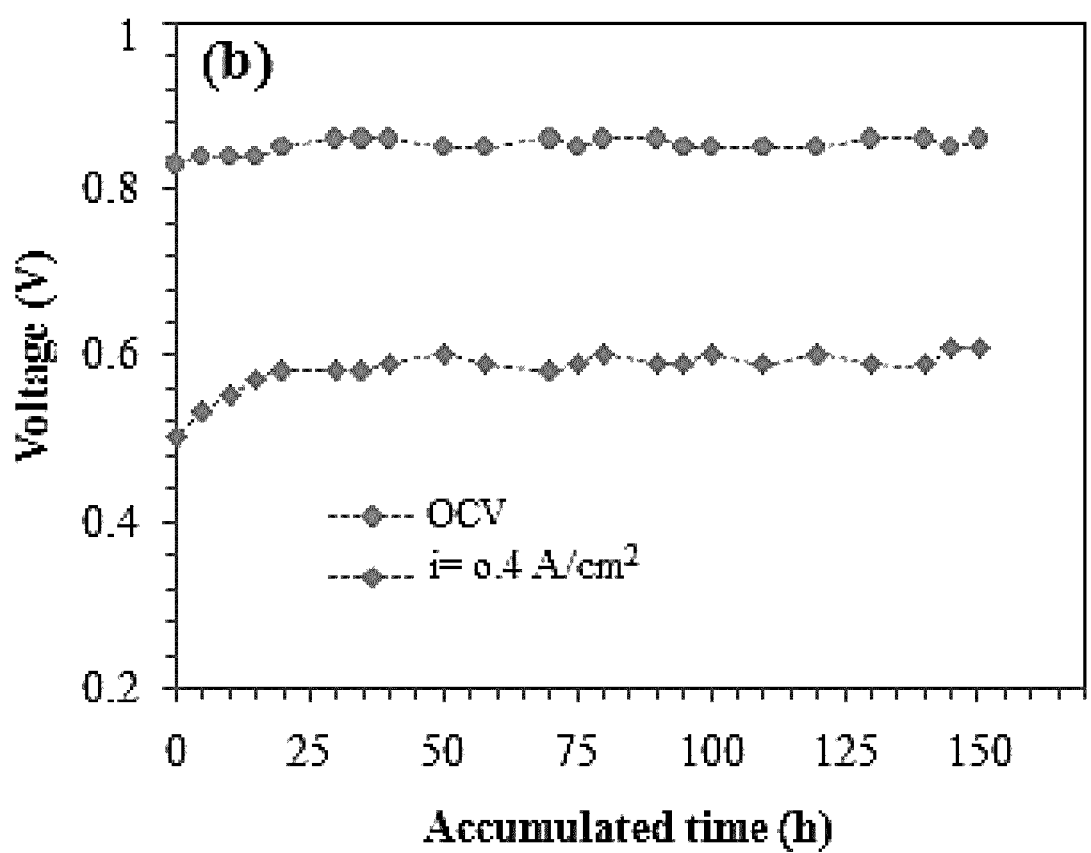
FIG. 19B shows a life test result of $SBA_{11}$-$PPDC_{34}$ membrane unit cell operated at 180° C. under a constant current loading of 0.4 A/cm², according to one implementation of the present disclosure.

FIG. 19A shows a life test result of a $PPDC_{34}$ membrane unit cell operated at 180° C. under a constant current loading of 0.4 A/cm² and FIG. 19B shows a life test result of a $SBA_{11}$-$PPDC_{34}$ membrane unit cell operated at 180° C. under a constant current loading of 0.4 A/cm². During each 24-hour cycle the life test was interrupted (12 times), including four complete shut downs after each sixty hours after the test started. Under a fixed loading current for a long time fuel cell test, two regions were observed in the output voltage versus testing time curve. The first initial testing period was the "activation region" in which cell voltage increased with operating time. The improvement of fuel cell performance at the "activation region" is due to the better contact of membrane with catalyst layers by the pressure of the end plates and expansion of the interface for the electrochemical reaction. Following the "activation region" was the "decline region", in which the cell voltage decreased with operating time. The decline of cell voltage during the latter stage of life test of $PPDC_{34}$ membranes was due to the leaching of $DC_3$ ionic liquid and PA from membrane.

Referring to FIG. 19B, it can be seen that a significant increase was observed in fuel cell life time of $SBA_{11}$-$PPDC_{34}$ composite membranes compared to $PPDC_{34}$ membranes. Due to retention of PA and $DC_3$ ionic liquid, SBA-15-Ph-$SO_3$H mesoporous increases fuel cell life time of $SBA_{11}$-$PPDC_{34}$ composite membranes. OCV value $SBA_{11}$-$PPDC_{34}$ composite membranes remained relatively constant over 150 hours and did not decrease. These results reflect the successful preparation of $SBA_{11}$-$PPDC_{34}$ composite membranes with high fuel cell performance which is suitable for applications in high temperature PEM fuel cells.

The well-ordered pores of acid functionalized SBA-15-Ph-$SO_3$H mesoporous provide a continuous proton transfer pathway which act as diffusional barriers to prevent the dicationic ionic liquid leaching from high temperature PBI composite membranes, thereby providing high fuel cell performance.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for synthesizing a proton exchange composite membrane, the method comprising:
preparing a PBI solution by dissolving PBI powder in a solvent;
adding an imidazolium-based dicationic ionic liquid to the PBI solution to obtain a second solution, the imidazolium-based dicationic ionic liquid comprising two singly charged imidazolium cations linked by an alkyl chain spacer, the singly charged imidazolium cations paired with two singly charged anions, wherein a molar ratio of the PBI to the imidazolium-based dicationic ionic liquid is between 2:1 and 9:1, the molar ratio calculated based on molecular weight of the repeating unit of PBI;
dispersing a mesoporous material in the second solution to obtain a third solution, wherein the mesoporous material is present at an amount ranging between 5 and 15 percent of a total weight of the PBI;
casting the third solution;
removing a solvent from the third solution to obtain a composite membrane; and
doping the composite membrane with an acid.

2. The method of claim 1, wherein the imidazolium-based dicationic ionic liquid includes anions selected from the group consisting of $CH_3CO_2$, $CH_3SO_4$, $C(CF_3SO_2)_2$, $(Tf_2N)$ $N(CF_3SO_2)_2$, $(TfO)CF_3SO_2$, $BF_4$, $PF_6$, $ASF_6$, $SbF_6$, $CF_3CO_2$, and $AlCl_4$.

3. The method of claim 1, wherein the imidazolium-based dicationic ionic liquid is selected from the group consisting of 1,3-di(3-methylimidazolium) propane bis (trifluoromethyl sulfonyl) imide, 1,6-di(3-methylimidazolium) hexane bis (hexafluorophosphate), 1,5 bis (3-benzyl-2-methyimidazolium) pentane di-bis (trifloromethanesulfonyl) imide, 1,5 bis (3-methyl-2-phenylimidazolium) pentane di-bis (trifloromethanesulfonyl) imide, 1,5 bis (2,3-dimethylimidazolium) pentane di-bis (trifloromethanesulfonyl) imide, 1,10 bis (2,3-methylimidazolium) decane di-bis (trifluoromethanesulfonyl) imide, 1,10 bis (2,3-dimethylimidazolium) decane di-bis (trifluoromethanesulfonyl) imide and combinations thereof.

4. The method of claim 1, wherein the imidazolium-based dicationic ionic liquid is selected from the group consisting of 1,3-di(3-methylimidazolium) propane bis (trifluoromethylsulfonyl) imide, 1,6-di(3-methylimidazolium) hexane bis (hexafluorophosphate), and combinations thereof.

5. The method of claim 1, wherein the mesoporous material is selected from the group consisting of SBA-15, SBA-16, MCM-41, and MCM-48.

6. The method of claim 1, wherein the mesoporous material is selected from the group consisting of mesoporous SBA-15 silica sulfonic acid and mesoporous SBA-15 silica phenyl sulfonic acid.

7. The method of claim 1, wherein doping the composite membrane includes using a phosphoric acid.

8. The method of claim 7, wherein the composite membrane is doped with phosphoric acid at a concentration of 85 wt % over approximately 5 days.

9. The method of claim 7, wherein the casting the third solution includes casting onto glass plates by a film applicator.

* * * * *